United States Patent
Medra et al.

(10) Patent No.: US 10,491,432 B1
(45) Date of Patent: Nov. 26, 2019

(54) SYSTEM AND METHOD FOR TURBO EQUALIZATION AND DECODING IN A RECEIVER

(71) Applicants: Ahmed Mohamed Ibrahim Medra, Kanata (CA); Hossein Najafi, Kanata (CA); Zhuhong Zhang, Ottawa (CA)

(72) Inventors: Ahmed Mohamed Ibrahim Medra, Kanata (CA); Hossein Najafi, Kanata (CA); Zhuhong Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/148,585

(22) Filed: Oct. 1, 2018

(51) Int. Cl.
*H04B 1/16* (2006.01)
*H04L 25/03* (2006.01)
*H04L 1/00* (2006.01)

(52) U.S. Cl.
CPC ......... *H04L 25/03057* (2013.01); *H04B 1/16* (2013.01); *H04L 1/0054* (2013.01)

(58) Field of Classification Search
CPC ..... H04L 1/005; H04L 1/0054; H04L 25/067; H04L 25/03057; H04L 25/03286; H04L 2025/03611; H04L 27/2628; H04L 27/2634; H04B 1/16; H03M 13/2957; H03M 13/6331; H03M 13/3905; H03M 13/3927; H03M 13/6525; H03M 13/653; H03M 13/6544; H03M 13/258
See application file for complete search history.

(56) References Cited

U.S. PATENT DOCUMENTS

2018/0287706 A1* 10/2018 Liu ................ H04L 25/03

OTHER PUBLICATIONS

L. Bahl, J. Cocke, F. Jelinek and J. Raviv, "Optimal decoding of linear codes for minimizing symbol error rate (Corresp.)," in IEEE Transactions on Information Theory, vol. 20, No. 2, pp. 284-287, Mar. 1974.
G. D. Forney, "The Viterbi algorithm," in Proceedings of the IEEE, vol. 61, No. 3, pp. 268-278, Mar. 1973.
C. A. Belfiore and J. H. Park, "Decision feedback equalization," in Proceedings of the IEEE, vol. 67, No. 8, pp. 1143-1156, Aug. 1979.
P. Vaidyanathan, "The Theory of Linear Prediction", Synthesis Lectures on Signal Processing. 2(1), pp. 1-198, Jan. 2007.
(Continued)

*Primary Examiner* — Rahel Guarino

(57) ABSTRACT

A symbol detection and forward error correction (FEC) decoding system and method are disclosed that aim to increase decoding performance and maintain an acceptable level of complexity. In one embodiment, the method includes performing detection and decoding over a plurality of iterations. During the first iteration: a first equalizer structure processes a received signal, and a FEC decoder performs decoding on an input obtained from the output of the first equalizer structure. During the other iterations: an iterative equalizer structure processes both (i) the received signal and (ii) an input obtained from an output of the FEC decoder from a previous iteration of the detection and decoding, in order to generate an output of the iterative equalizer structure, and the FEC decoder performs FEC decoding on an input obtained from the output of the iterative equalizer structure.

24 Claims, 15 Drawing Sheets

(56) References Cited

OTHER PUBLICATIONS

B. NG, C. T. Lam and D. Falconer, "Turbo frequency domain equalization for single-carrier broadband wireless systems," in IEEE Transactions on Wireless Communications, vol. 6, No. 2, pp. 759-767, Feb. 2007.
J. K. Nelson, A. C. Singer, U. Madhow and C. S. McGahey, "BAD: bidirectional arbitrated decision-feedback equalization," in IEEE Transactions on Commun., vol. 53, No. 2, pp. 214-218, Feb. 2005.
S. Ten Brink,"Designing iterative decoding schemes with the extrinsic information transfer chart," AEU Int. J. of Electronics and Commun, vol. 54, No. 6, pp. 389-398, Nov. 2000.

* cited by examiner

SYSTEM AND METHOD FOR TURBO EQUALIZATION AND DECODING IN A RECEIVER

FIELD

The present application relates generally to data communication, and in particular to turbo equalization and decoding in a receiver of a communication system.

BACKGROUND

In a data communication system, data is transmitted from a transmitter to a receiver. The implementation of the transmitter and receiver depends upon the channel over which the data is to be transmitted, e.g. whether the channel is wireless, a cable, or an optical fiber. Data transmitted over a channel is subject to degradation in transmission because of noise in the channel.

For example, in a data communication link over a fiber channel, the spectrum of the transmitted data signal may be cut due to the presence of optical or electrical components, such as wavelength selective switches (WSS's) or electrical drivers that do not accommodate the entire signal bandwidth. At an optical receiver, coherent detection may be performed, in which equalizers are used to mitigate channel impairments, e.g. optical impairments such as chromatic dispersion (CD) or polarization mode dispersion (PMD). In the case of dual polarization optical transmission, the impairments may be mitigated using a linear equalizer implemented as a 2×2 butterfly multiple-input multiple-output (MIMO) structure. In the context of a wireless channel, a receiver may try to remedy signal degradations associated with wireless channel specific conditions such as fading.

Although the linear equalizer in the receiver may mitigate the effect of inter-symbol interference (ISI) associated with the use of narrowband filters by band-limiting components in the optical-electrical or electrical-electrical path, the equalizer may also result in the amplification and coloring of noise. This is a common issue in any linear equalizer. Either or both of the amplification and the coloring of noise, in turn, may significantly degrade the bit-error-rate (BER) performance of the system.

Possible solutions include increasing the signal-to-noise ratio (SNR) and/or increasing the complexity of equalization by further processing of the output of the linear equalizer (2×2 MIMO) using a second post-compensation stage at the receiver in order to try to reduce the BER before the forward error correction (FEC) decoding to try to achieve zero post-FEC BER. However, increasing the SNR typically results in more power consumption at the transmitter side, and in some scenarios may lead to non-linear channel distortion. On the other hand, increasing the complexity of the equalization with a post-compensation stage at the receiver adds complexity, which typically increases power consumption and required implementation resources and may also add delay in decoding of the data in the received signal.

SUMMARY

It is desired to improve equalization and FEC decoding in a receiver to try to improve decoding performance, e.g. decrease BER, while maintaining an acceptable level of complexity.

In one embodiment, a receiver is provided including an equalizer and a FEC decoder to perform detection and decoding of a block of symbols over a plurality of iterations. The equalizer may include: (i) a first equalizer structure for use during a first iteration i=1 of the detection and decoding, and (ii) an iterative equalizer structure for use during one or more other iterations i>1 of the detection and decoding. During the first iteration i=1 of the detection and decoding: an input to the first equalizer structure is obtained from a received signal carrying the symbols, and an input to the FEC decoder is obtained from an output of the first equalizer structure. During each one of the one or more other iterations i>1 of the detection and decoding: the input to the FEC decoder is obtained from an output of the iterative equalizer structure; one input to the iterative equalizer structure is obtained from the received signal; and another input to the iterative equalizer structure is obtained from an output of the FEC decoder from a previous iteration of the detection and decoding.

In another embodiment, a method is provided that is performed by a receiver during detection and decoding of a block of symbols over a plurality of iterations. The receiver includes a FEC decoder, a first equalizer structure, and an iterative equalizer structure. During a first iteration i=1 of the detection and decoding: the first equalizer structure processes a received signal carrying the symbols to generate an output, and the FEC decoder performs FEC decoding on an input obtained from the output of the first equalizer structure. During each one of one or more other iterations i>1 of the detection and decoding: the iterative equalizer structure processes both (i) the received signal carrying the symbols and (ii) an input obtained from an output of the FEC decoder from a previous iteration of the detection and decoding, in order to generate an output of the iterative equalizer structure; and the FEC decoder performs FEC decoding on an input obtained from the output of the iterative equalizer structure.

In the receiver structure and method of some embodiments, it may be possible to achieve comparable performance to optimal methods (e.g. comparable performance to Bahl, Cocke, Jelinek and Raviv (BCJR) equalization), but using fewer resources to result in a more efficient implementation.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Figure 1:
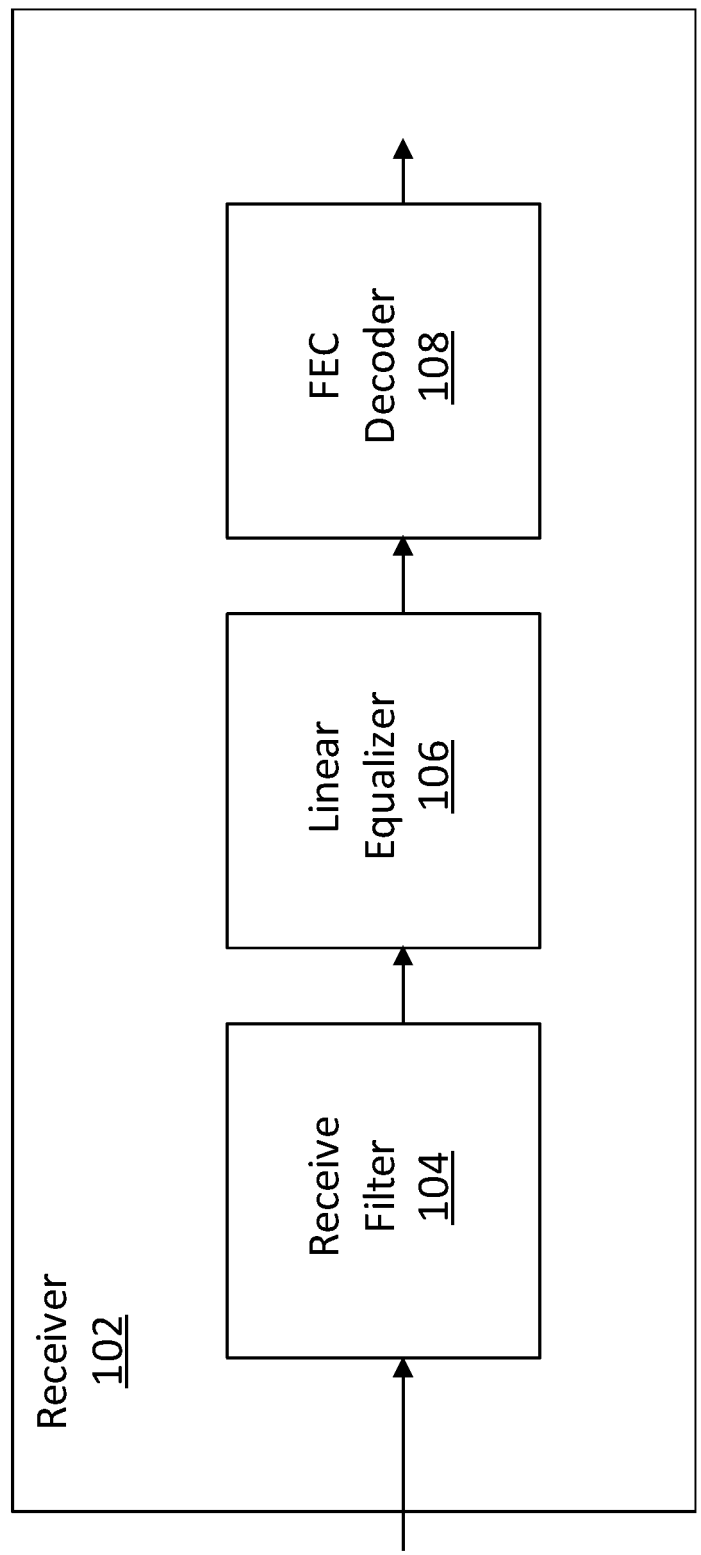
FIG. 1 is a block diagram of a receiver in a communication system, according to one embodiment.

FIG. 1 is a block diagram of a receiver 102 in a communication system, according to one embodiment. The receiver 102 includes a receive filter 104, a linear equalizer 106, and an FEC decoder 108. Regardless of whether the communication system is optical or electrical, e.g. regardless of whether the communication system uses a fiber optic channel, wireless channel, or wireline channel, the received signal is converted into a digital signal in the electrical domain and is typically processed using the receive filter 104, linear equalizer 106, and FEC decoder 108. In some embodiments, the receive filter 104 may only be a single filter, e.g. a matched filter. In other embodiments, the receive filter 104 may represent multiple filters. For example, the receive filter 104 may implement analog-to-digital conversion (ADC), driver(s), and matched filter(s). It should be understood that the filter 104 may also be controllable or adjustable.

In operation, the digital signal in the electrical domain is first filtered using the receive filter 104, e.g. to try to improve the SNR of the received signal. The filtered signal is then processed by the linear equalizer 106 to try to mitigate or diminish the effects of inter-symbol interference (ISI) from the channel. The symbols carried by the equalized signal are then decoded using the FEC decoder 108. The receiver 102 may include other components, but these have been omitted for the sake of clarity.

As one example, the receiver 102 may be part of an optical communication system. Data at a transmitter of the optical communication system is encoded using an FEC encoder and mapped to symbols. Pulse shaping and pre-compensation are then performed, followed by digital-to-analog conversion, and the signal is transmitted over an optical fiber using a laser. The receiver 102 includes an integrated coherent receiver structure to perform optical-to-electrical conversion, followed by analog-to-digital conversion, and the digital signal is then forwarded to the receive filter 104. In some embodiments, receive filter 104 may be a matched filter. Chromatic dispersion compensation may also be performed. The linear equalizer 106 may be a multiple-input multiple-output (MIMO) equalizer, e.g. a frequency domain MIMO equalizer.

As another example, the receiver 102 may be part of a wireless communication system, in which case one or more antennas are used at the receiver 102 to receive the wirelessly transmitted signal. As another example, the receiver 102 may be part of a wireline communication system, in which case the receiver 102 receives the transmitted signal over a coaxial cable. Therefore, the implementation of the receiver 102 will depend upon the communication system in which the receiver 102 operates. However, regardless of the details of the implementation, the receiver 102 of FIG. 1 still performs at least linear equalization (via linear equalizer 106) and FEC decoding (via FEC decoder 108).

The presence of the linear equalizer 106 in the receiver 102 may result in amplification and coloring of the noise in the received signal. In order to try to mitigate the performance loss due to noise coloring, a second-stage post-compensation architecture may be incorporated into the receiver 102.

Figure 2:
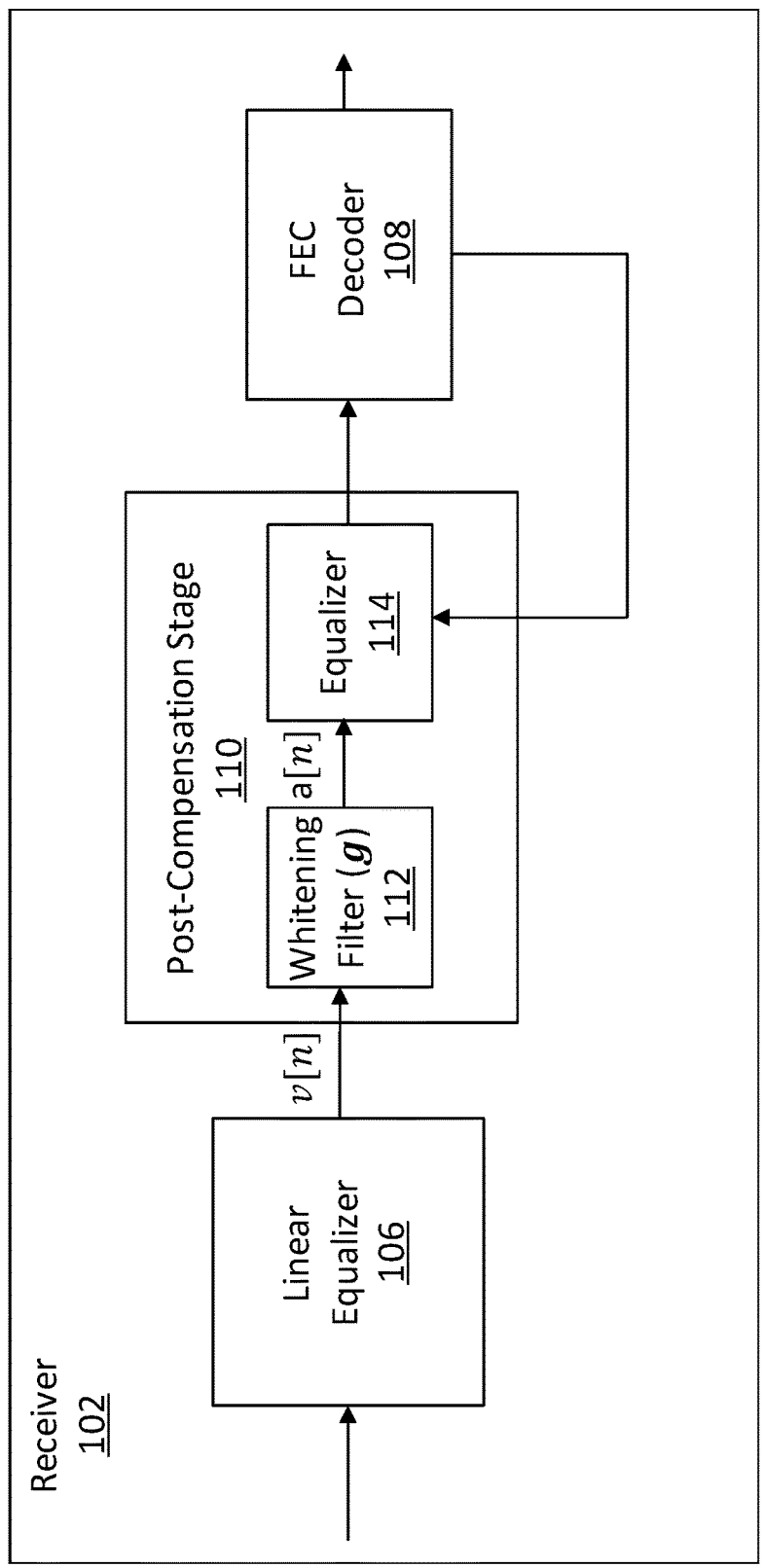
FIG. 2 illustrates the receiver modified to incorporate a post-equalization compensation stage, according to one embodiment.

FIG. 2 illustrates the receiver 102 modified to incorporate a post-equalization compensation stage, according to one embodiment. Those skilled in the art will appreciate that, although receive filter 104 is not illustrated for the sake of brevity, in many embodiments receive filter 104 would be present and placed schematically prior to linear equalizer 106. The post-equalization compensation stage will be referred to as post-compensation stage 110. Post-compensation stage 110 includes a whitening filter 112 followed by an equalizer 114. In some embodiments, the whitening filter 112 may be implemented as a linear filter. The filtering function applied by whitening filter 112 will be designated using the notation g, where g is a vector representing the M taps of the filter $g_0 \ldots g_{M-1}$. The equalizer 114 may be implemented as a non-linear equalizer, and is sometimes called a second stage equalizer. In operation, the output of the linear equalizer 106 is passed to the whitening filter 112. The filter taps of the whitening filter 112 are estimated according to the noise correlation in the signal after the linear equalizer 106. The application of the whitening filter 112 aims to make noise in the received signal more white, but the whitening filter 112 has the drawback that it may make the data symbols more correlated. The noise-whitened signal is then passed to equalizer 114, which applies equalization to mitigate the impact of the whitening filter 112 on the symbols. By implementing the equalizer 114 as a non-linear equalizer, noise enhancement may be mitigated or avoided. With the addition of the post-compensation stage 110, the FEC decoding of each symbol performed by FEC decoder 108 may become iterative. An output of the FEC decoder 108 is fed back to the equalizer 114 to try to improve the performance of the equalizer 114. The updated output from the equalizer 114 is then fed to the input of the FEC decoder 108 for the next iteration. Two or more FEC decoding iterations may be implemented to decode a symbol.

Each iteration may be referred to as a turbo loop or global loop, and the iterative operation of the equalizer 114 and FEC decoder 108 may be referred to as a turbo equalization and decoding scheme. However, the word "turbo" does not mean that the channel code being used is necessarily a turbo code, e.g. the FEC decoder does not have to be a turbo decoder. Instead, the word "turbo" is used to indicate an iterative loop in which the output of the FEC decoder is fed back to an equalizer, which updates input to the FEC decoder in the next iteration.

In turbo equalization, the second-stage equalizer 114 is implemented inside the turbo loop. The output of the second-stage equalizer 114 is fed to the FEC decoder 108 as a-priori information. The FEC decoder 108, in turn, provides an output, or extrinsic information, to the second stage equalizer 114, which can use it as a-priori information during the next detection-decoding loop in a turbo fashion.

In FIG. 2, the equalized received signal after the linear equalizer 106 is designated v[n], where n refers to the sample index in time. If the receiver 102 is an optical receiver, v[n] may be associated with one of two polarizations of the received optical signal, e.g. the X or Y polarization. In such a case, the notation v[n] may be replaced with $v_p[n]$, with p designating which polarization the sample is associated with. However, because the receiver 102 is not specific to an optical communication system, the received signal will be designated using the more general notation v[n].

The received signal, v[n], may be expressed as v[n]=s[n]+z[n], where s[n] is the transmitted symbol (e.g. on the X or Y polarization in the example of an optical communication system), and z[n] is the correlated additive noise. In order to try to whiten the noise, the signal v[n] is filtered using the whitening filter g such that the output of whitening filter 112 is represented by $$a[n] = \sum_{m=0}^{M-1} g[m]s[n-m] + \hat{z}[n],$$

where $\hat{z}[n]$ is the white additive noise due to filtering of z[n] with the whitening filter g.

Figure 3:
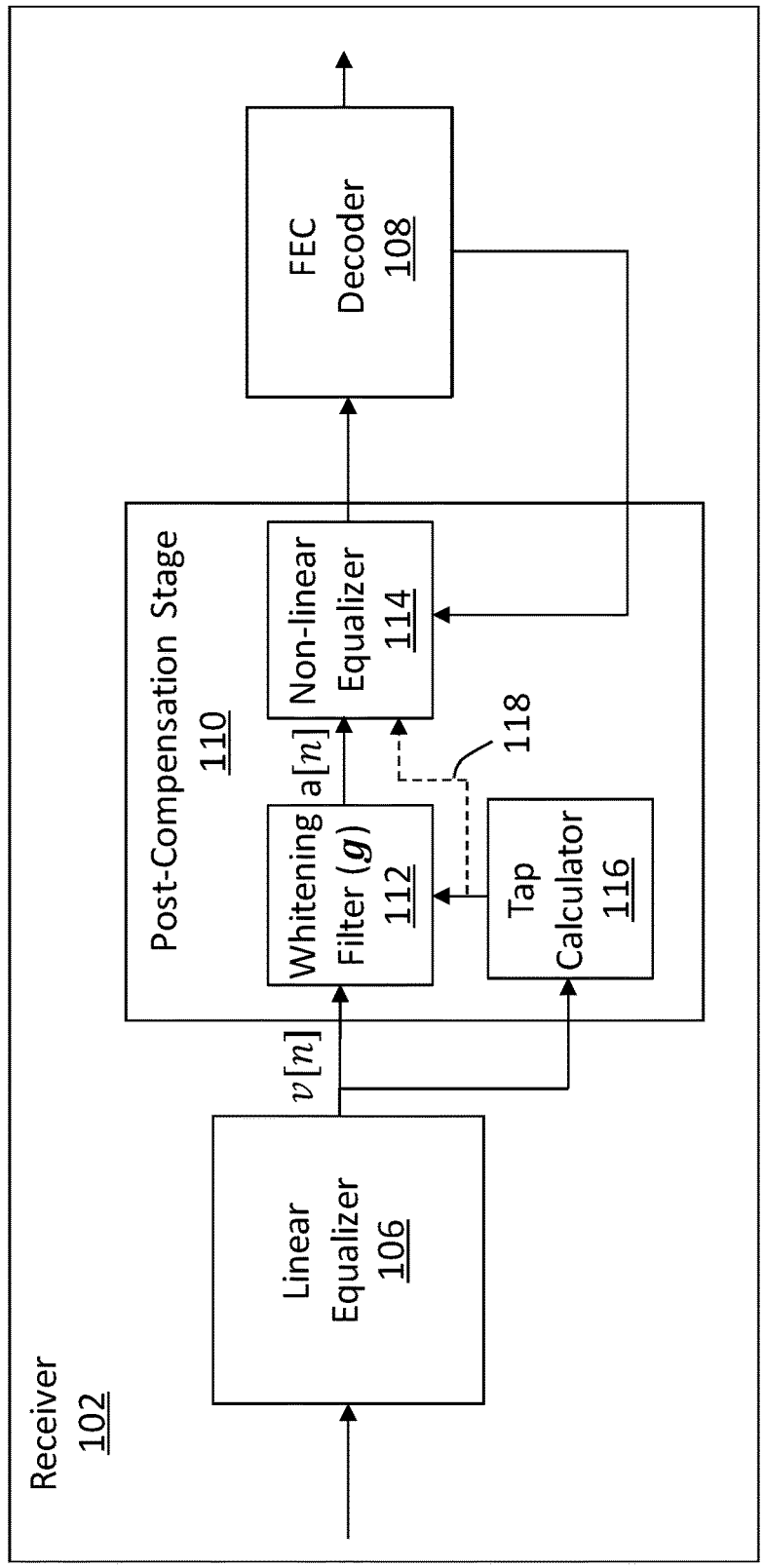
FIG. 3 illustrates a variation of FIG. 2 in which a tap calculator is included to compute the taps of the whitening filter.

FIG. 3 illustrates a further embodiment of the receiver 102 of FIG. 2 in which a tap calculator 116 is included to compute the taps of the whitening filter g. In one embodiment, the taps of the whitening filter g are determined by computing the noise correlation, which may be determined using transmitted pilot signals. The transmitted pilot signals are known a priori by both the transmitter and receiver As such, an estimate of the noise correlation can be determined based on a comparison of the received pilot signal and the known transmitted pilot signal. In other embodiments, the data itself may be used to compute the taps. The taps of the filter g may either be real-valued or complex-valued taps. In operation, the received signal v[n] is passed to both the tap calculator 116 and the whitening filter 112. The taps of the whitening filter 112 are computed using the tap calculator 116. The computed taps may also be used by the equalizer 114, e.g. in the manner described later in relation to some embodiments, which is why dashed arrow 118 is also present in FIG. 3. However, in general the equalizer 114 does not necessarily receive and/or use the computed taps. After tap calculation, the received signal is filtered by whitening filter 112 in order to try to whiten the noise. However, this process results in the equalized symbols becoming correlated. The equalizer 114 is therefore used to recover the symbols. In one embodiment, during each iteration of the turbo decoding, the equalizer 114 equalizes the filtered signal, and its output in terms of log-likelihood ratios (LLRs) is multiplied by a factor and passed to the FEC decoder 108. The FEC decoder 108 output is multiplied by a factor and fed back again to the equalizer 114 as a-priori information to be used in the following iteration, and so on.

As discussed above, the whitening filter 112 is used to mitigate the problem of noise correlation, but the whitening filter 112 typically causes the linearly equalized symbols to become correlated. Equalizer 114 is therefore used to try to remove the impact of the noise whitening filter 112 on the symbols and avoid noise enhancement or coloring again. One possibility is to implement equalizer 114 as the Bahl, Cocke, Jelinek and Raviv (BCJR) equalizer, which is described in detail in L. Bahl, J. Cocke, F. Jelinek and J. Raviv, "Optimal decoding of linear codes for minimizing symbol error rate (Corresp.)," in *IEEE Transactions on Information Theory*, vol. 20, no. 2, pp. 284-287, March 1974. The BCJR equalizer is an optimal symbol by symbol detector, but its implementation is typically considered to have large computational complexity, especially for higher order quadrature amplitude modulation (QAM). Furthermore, the complexity of the BCJR filter does not scale well as the number of filter taps M of the whitening filter 112 increases. The BCJR equalizer is a trellis based equalizer whose complexity grows exponentially with the channel memory and constellation size. Another possibility is to use a soft-output Viterbi algorithm (SOVA) as maximum likelihood sequence estimation (MLSE). MLSE is an optimal sequence detector, as described in G. D. Forney, "The Viterbi algorithm," in *Proceedings of the IEEE*, vol. 61, no. 3, pp. 268-278, March 1973. However, the trellis structure in BCJR and SOVA (the Viterbi algorithm) is computationally complex, and the introduced delay of a sequential process over trellis may be a significant limiting factor in hardware implementation, even with parallelization of the trellis structure. With the trellis nature of these algorithms, there is exponential complexity in the filter length and the constellation size.

The problems of delay and complexity in the equalization and decoding at the receiver are even more pronounced when the equalizer is implemented inside the FEC decoding loop, as is the case with the receiver 102 illustrated in FIGS. 2 and 3. With the equalizer 114 inside the turbo loop, its complexity is a bottle neck issue for low-latency and low-complexity implementation. With the iterative nature of exchanging soft information in the turbo loop, e.g. exchanging soft information between the post-compensation stage and the FEC decoding in the turbo scheme, the complexity and delay caused by the equalizer 114 may significantly limit the number of iterations inside the turbo loop and/or the number of the internal FEC iterations. In general, the larger the number of iterations, the better the bit error rate performance of the receiver, but also the larger the delay. For a given amount of implementation resources (e.g., gates, power consumption), it is desired to improve the performance by maximizing the number of iterations that can be carried out within a given delay. The BCJR is optimal in terms of error rate, yet complex, which increases computational complexity and delay to a point that may not be acceptable.

In view of the above, embodiments below introduce equalizer structures that may achieve comparable performance to equalization techniques such as BCJR equalization, but use fewer resources than BCJR equalization. Some embodiments below incorporate a decision feedback equalizer (DFE) and/or linear predictive coding (LPC) algorithms, which are described in the following publications:

(1) C. A. Belfiore and J. H. Park, "Decision feedback equalization," in *Proceedings of the IEEE*, vol. 67, no. 8, pp. 1143-1156, August 1979.

(2) P. Vaidyanathan, "The Theory of Linear Prediction", Synthesis Lectures on Signal Processing. 2(1), January 2007.

(3) B. Ng, C. t. Lam and D. Falconer, "Turbo frequency domain equalization for single-carrier broadband wireless systems," in *IEEE Transactions on Wireless Communications*, vol. 6, no. 2, pp. 759-767, February 2007.

One important feature of DFE and LPC algorithms is that their complexity is linear with respect to the number of constellation points and the filter length. Also, the implementation of each algorithm can be done separately as a stand-alone equalizer for applications that require low-power/complexity implementations.

Iterative Frequency Domain Equalization

Figure 4:
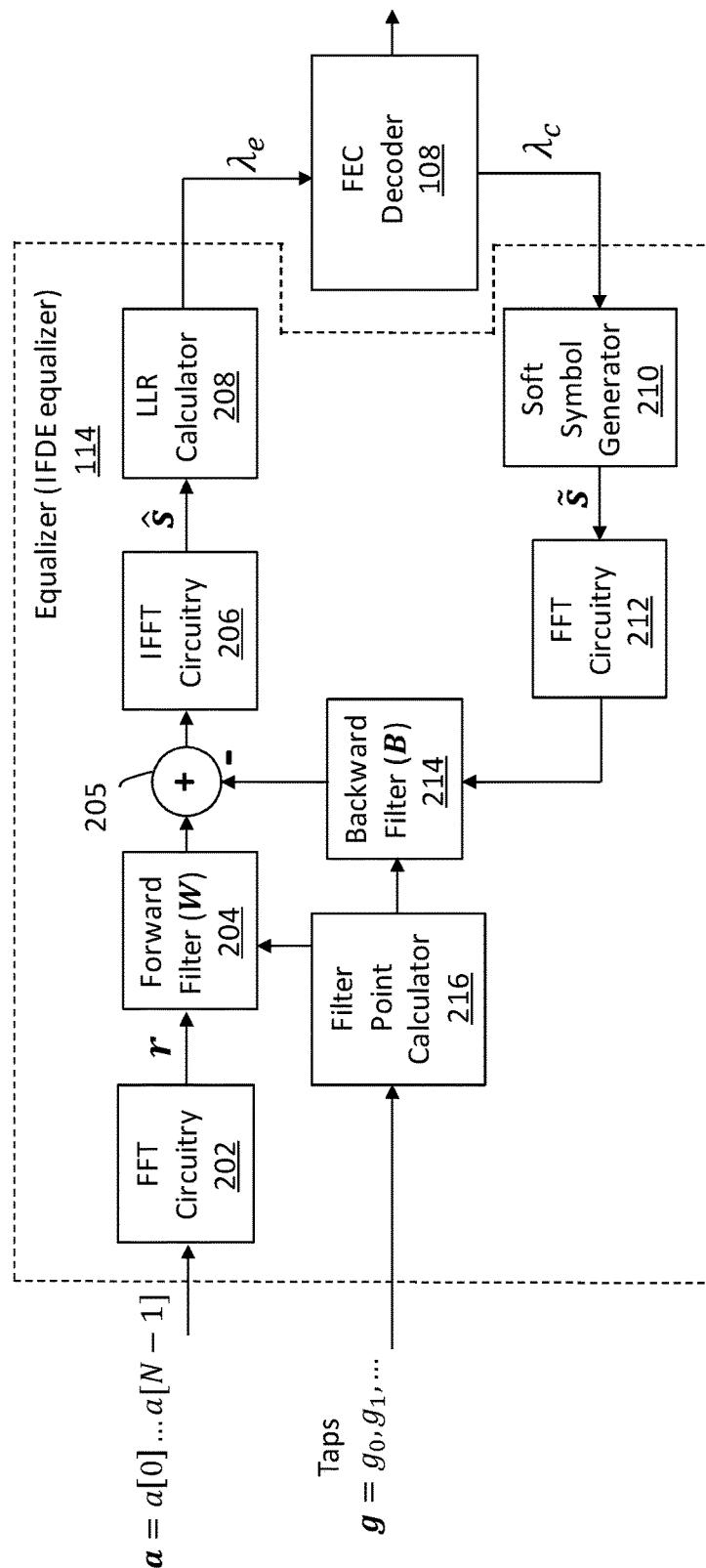
FIGS. 4 and 5 each is a block diagram of the post-compensation stage equalizer and FEC decoder of FIG. 3, according to different embodiments.

FIG. 4 is a block diagram of equalizer 114 and FEC decoder 108 of FIG. 3, according to one embodiment. The equalizer 114 is a non-linear equalizer and will be referred to as an iterative frequency domain equalizer (IFDE). The FEC decoder 108 is implemented as a soft-input-soft-output (SISO) FEC decoder 108. The main principle of FIG. 4 is based on trying to improve the estimate of a received symbol by exploiting the a-priori information fed back from the FEC decoder 108 during the iterative detection-decoding procedure.

In operation, a block of N samples a of the received signal (after the whitening filter 112) are provided to the IFDE and correspond to N symbols to be decoded. In the following description a=a[0], . . . , a[N−1], where a[n] n=0, . . . N−1 designates one of the N samples. The N samples are input into discrete Fourier transform (DFT) circuitry, e.g. fast Fourier transform (FFT) circuitry 202, which applies a DFT of N points. Using a FFT algorithm is only an example implementation. An alternative algorithm may be used instead for performing the DFT. DFT and FFT are known in the art, as are inverse DFT and inverse FFT (IFFT) mentioned below. An example of the FFT algorithm and corresponding IFFT algorithm is disclosed in the textbook "Signals and Systems" by Simon Haykin and Barry Van Veen, published in 1999 by John Wiley & Sons Inc., and so will not be repeated here for the sake of brevity.

The output of the FFT circuitry 202 may be expressed as: r=Fa=FGs+Fẑ, where r is the output of the FFT circuitry 202, F is the FFT matrix of size N, a is defined above, G is the whitening filter convolutional matrix, s is the block of symbols to be decoded, where s=s[0], . . . , s[N−1], and ẑ is the additive white Gaussian noise (AWGN) vector, with each entry of the AWGN vector corresponding to the AWGN for a respective one of the symbols. For a particular sample a[n] of the block of received samples a, a[n] may be expressed as $$a[n] = \sum_{m=0}^{M-1} g[m]s[n-m] + \hat{z}[n],$$

where ẑ[n] is the component of ẑ corresponding to symbol a[n]. Note that a=Gs+ẑ.

For a given iteration i of the iterative detection-decoding procedure, the parameters and outputs will be designated using the superscript i. For example, the value of the forward filter matrix in iteration i will be designated as $W^i$.

For a given iteration i of the iterative detection-decoding procedure, the output r of the FFT circuitry 202 is passed to a forward filter 204, which is an N-point filter. The forward filter 204 multiplies the signal r by forward filter matrix $W^i$. The entries, i.e. points, of the forward filter matrix $W^i$ are dependent upon the iteration and are computed by filter point calculator 216 in the manner explained below. Meanwhile, the output of the FEC decoder 108 from the previous iteration, which will be referred to as extrinsic information $\lambda_c^{i-1}$, is passed to a soft symbol generator 210. The soft symbol generator 210 generates a soft estimate of each symbol of the transmitted block of N symbols, given the current constellation. For iteration i, the soft symbol generator 210 remaps the output of the FEC decoder 108 (extrinsic information $\lambda_c^{i-1}$) back to a corresponding block of symbol $\tilde{s}^{i-1}$ in the constellation. For example, each symbol in $\tilde{s}^{i-1}$ may be the closest symbol in the constellation to extrinsic information $\lambda_c^{i-1}$ corresponding to that signal.

The symbol $\tilde{s}^{i-1}$ are then passed to DFT circuitry, e.g. FFT circuitry 212, which applies a DFT of N points. Using a FFT algorithm to perform the DFT is only an example implementation. The output of the FFT circuitry 212 is passed to backward filter 214, which is an N-point filter. The backward filter 214 multiplies the signal by backward filter matrix $B^i$. The entries (points) of the backward filter matrix $B^i$ are dependent upon the iteration and are computed by filter point calculator 216 in the manner explained below. The output of forward filter 204 and backward filter 214 are then combined by a combiner 205. The combining may be subtracting one filtered value from the other, e.g. subtracting the output of the two filters by subtracting the output of the backward filter 214 from the output of the forward filter 204. For example, combiner 205 may be implemented by circuitry to subtract one input signal from another input signal and/or by a processor that performs subtraction. The output of the combiner is passed to IDFT circuitry, e.g. IFFT circuitry 206, which performs an IDFT. Using the IFFT algorithm to perform the IDFT is only an example. The output of the IFFT circuitry 206 is a block of N symbol estimates $\hat{s}^i$. Each symbol estimate in the block of N symbol estimates $\hat{s}^i$ corresponds to a respective one of the N symbols to be decoded.

The block of N symbol estimates $\hat{s}^i$ is passed to LLR calculator 208, which computes the log-likelihood-ratio (LLR) of the bits corresponding to each one of the N symbol estimates. Example ways to compute the LLR are explained below. The output of the LLR calculator 208 is extrinsic information $\lambda_e^i$, which is passed to the FEC decoder 108. The FEC decoder 108 is a SISO FEC decoder 108 that implements a decoding algorithm to output extrinsic information $\lambda_c^{i-1}$. An example of an algorithm that may be implemented by FEC decoder 108 is the message passing algorithm. An example of the message passing algorithm is disclosed in "Information Theory, Inference, and Learning Algorithms" by David J. C. MacKay published in 2003 by Cambridge University Press, and so will not be repeated here for the sake of brevity. Other example algorithms that may be implemented by FEC decoder 108 include trellis decoding algorithms, such as the Viterbi algorithm.

The iterative process may be repeated until a valid codeword is found or for a maximum number of iterations.

During the $i^{th}$ iteration, the block of N symbol estimates $\hat{s}^i$ may be expressed and computed as $\hat{s}^i = F^H(W^i r - B^i F \tilde{s}^{i-1})$, where $W^i = \text{diag}\{w_0^i, w_1^i, \ldots, w_{N-1}^i\}$ is the forward matrix used in the $i^{th}$ iteration, and $B^i = \text{diag}\{b_0^i, b_1^i, \ldots, b_{N-1}^i\}$ is the backward matrix used in the $i^{th}$ iteration. The two matrices W and B are calculated according to the MMSE criterion $\min\{E|\hat{s}-s|^2\}$. The MMSE criterion is discussed in more detail in B. Ng, C. t. Lam and D. Falconer, "Turbo frequency domain equalization for single-carrier broadband wireless systems," in *IEEE Transactions on Wireless Communications*, vol. 6, no. 2, pp. 759-767, February 2007.

By equating $$\frac{1}{N}\sum_{n=0}^{N-1} |\widehat{s_n} - s_n|$$

to zero, it yields the computation that is performed by filter point calculator 216 at iteration i to compute the components of $W^i$ and $B^i$:

$$w_n^i = \frac{\bar{g}_n^*(1 + b_n^i)}{\sigma^2 + |\bar{g}_n|^2}, n = 0, 1, \ldots, N-1$$

and $$b_n^i = \frac{\lambda(\sigma^2 + |\bar{g}_n|^2) - \sigma^2}{(\sigma^2 + |\bar{g}_n|^2) - \rho^i|\bar{g}_n|^2}, n = 0, 1, \ldots, N-1$$

where $$\lambda = \sigma^2 \frac{\sum_{n=0}^{N-1} \frac{1}{(\sigma^2 + |\bar{g}_n|^2) - \rho^i|\bar{g}_n|^2}}{\sum_{n=0}^{N-1} \frac{\sigma^2 + |g_n|^2}{(\sigma^2 + |\bar{g}_n|^2) - \rho^i|\bar{g}_n|^2}},$$

$\bar{g}_n$ is the frequency pins of the filter G (FFT of g), ρ is the FEC reliability parameter, and $\sigma^2$ is the noise variance. The FEC reliability parameter ρ is calculated based on the a-priori information fed back from the FEC decoder 108. For example, in the case of BPSK, or in the case of QPSK if independent processing of real and imaginary dimensions, then the FEC extrinsic information $\lambda_c$ is used to generate the soft symbol $\tilde{s}=\tan h(0.5\lambda_c)$ and FEC reliability parameter ρ is computed as the mean of the square of the soft symbols: $\rho=\text{mean}(|\tilde{s}|^2)$, e.g. $\rho^i=\text{mean}(|\tilde{s}^{i-1}|^2)$.

As mentioned above, the output $\hat{s}^i$ of the IFFT circuitry 206 is used to compute the LLRs to be passed to the FEC decoder 108. In the case of QPSK, extrinsic information $\lambda_e^i$ is computed by the LLR calculator 208 as $$\lambda_e^i = \frac{2\gamma^i \hat{s}^i}{(\eta^i)^2}$$

where $$\gamma^i = \frac{1}{N} \sum_{n=0}^{N-1} w_n^i \bar{g}_n$$

is a measure of the signal power during the $i^{th}$ iteration and $(\eta^i)^2$ measures the noise plus interference power and is defined as $$(\eta^i)^2 = \frac{\sigma^2}{N} \sum_{n=0}^{N-1} \frac{|1 + b_n^i \rho^i|^2}{\sigma^2 + |g_n|^2} + \frac{1}{N}(\rho^i - \rho^{i^2}) \sum_n |b_n^i|^2 - 1 + 2\gamma^i - (\gamma^i)^2$$

Extrinsic information $\lambda_e^i$ is then passed to the FEC decoder 108 as LLRs.

In case of higher order modulation M-QAM, the soft symbols $\tilde{s}$ and the FEC reliability parameter ρ can be computed as follows.

By defining the FEC LLR output as $$\lambda_{c_j} = \log\left(\frac{P(c_j = 1)}{P(c_j = 0)}\right)$$

where $c_j \in \{0,1\}$ is the transmitted bit, and the constellation $Q=\{q_1, q_2, \ldots, q_M\}$, where $q_m \in Q$ is a constellation symbol which requires $\log_2(M)$ bits, the soft estimate of the transmitted symbols $\tilde{s}$ can be computed as $$\tilde{s} = \sum_{q_m \in Q} q_m \cdot P(s = q_m) = \sum_{q_m \in Q} q_m \cdot \prod_{j=1}^{\log_2(M)} P(c_j = b_j)$$

where $b_j$ is the $j^{th}$ bit in symbol $q_m$. The covariance of the soft symbol $\tilde{s}$, $v_s$, can be calculated by $$v_s = \left(\sum_{q_m \in Q} |q_m|^2 P(s = q_m)\right) - |\tilde{s}|^2$$

and the FEC reliability parameter ρ is computed as $\rho=1-v_s$ when the constellation symbols have unity average power.

Iterative Time Domain Equalization

The iterative frequency domain equalizer (IFDE) discussed above in relation to FIG. 4 has the following possible benefit: the implementation of the filtering using FFT/IFFT may significantly reduce the required computations compared to the time-domain convolution operation. However, if the number of taps involved in the filtering operation is small, implementing the filtering operation in the time-domain may be beneficial because the filter taps are few and there is no need for the FFT/IFFT operations. Lower implementation resources may be required to implement the filtering operations in the time domain if the number of filter taps is small. In an implementation in which the filtering operations are performed in the time domain, all of the equations discussed above describing the IFDE are computed, followed by finding the IDFT of the two filters B and W, e.g. using the IFFT algorithm, which will be donated by $b_t$ and $w_t$.

Figure 5:
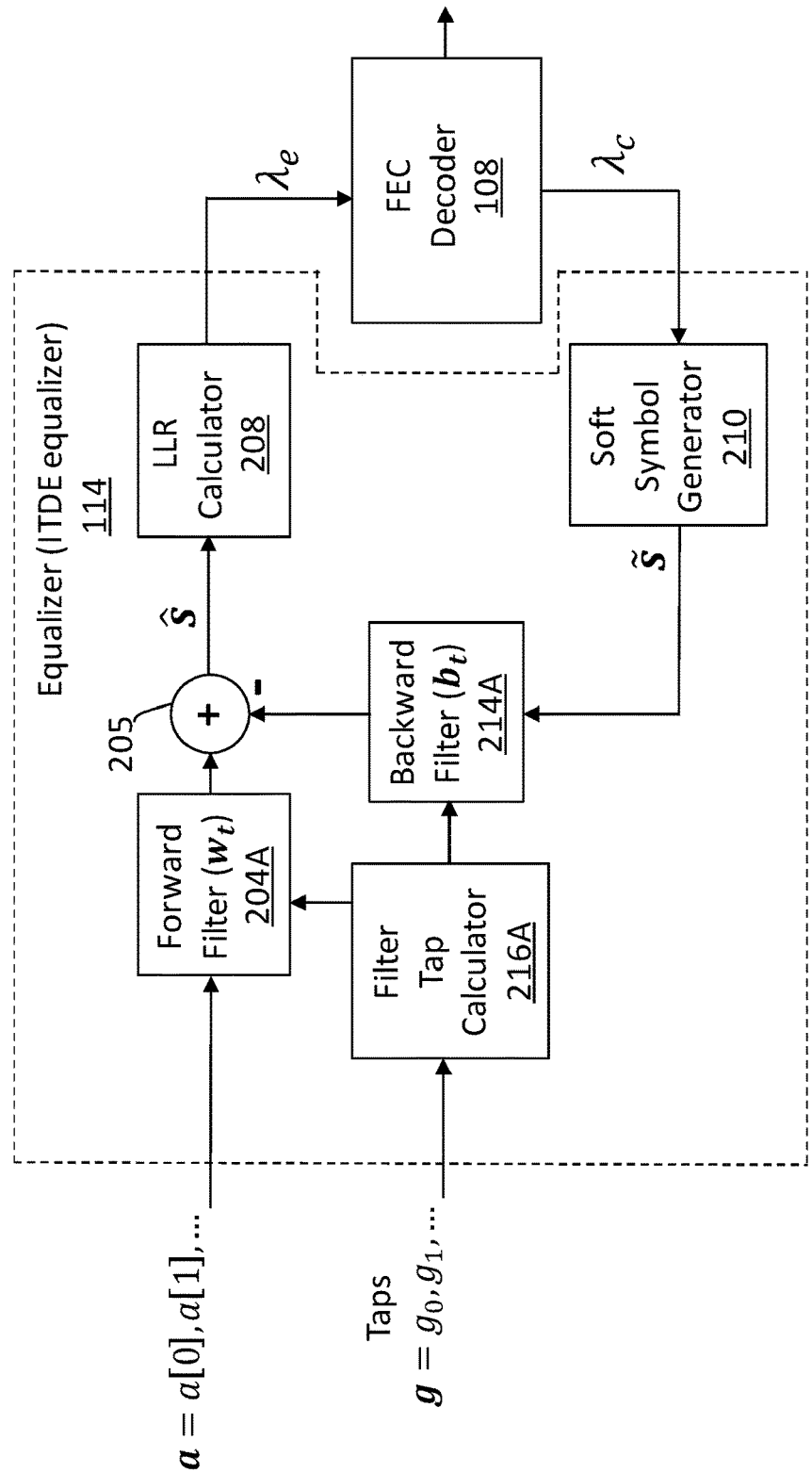

The IFDE modified to instead implement the filtering operation in the time-domain will be referred to as an iterative time domain equalizer (ITDE). An illustrative embodiment of an ITDE is illustrated in FIG. 5. Note that the FFT and IFFT circuitry is no longer present, forward filter 204A is designated by $w_t$, backward filter 214A is designated by $b_t$, and the taps of $w_t$ and $b_t$ are computed by the filter tap calculator 216A. Filter tap calculator 216A performs the same computations as filter tap calculator 216 of FIG. 4, except additionally computing the IDFT of W and B to obtain the taps $w_t$ and $b_t$. Note that, in general, the error performance of both the IFDE and ITDE is identical, with the only significant difference being the way the filtering process is realized, i.e. whether in the time-domain (ITDE) or in the frequency domain (IFDE).

In some embodiments, during operation, the equalizer 114 may switch between an ITDE and an IFDE based on the channel conditions. For each block of symbols s to be decoded, the number of taps to be involved in the filtering operation, e.g. the number of taps of the whitening filter g, are determined, which is based on the channel conditions. If the number of taps is below a predetermined threshold, then equalizer 114 used in the iterative detection and decoding of the block of symbols s is implemented as an ITDE. Otherwise, if the number of taps is above a predetermined threshold, then the equalizer 114 used in the iterative detection and decoding of the block of symbols s is implemented as an IFDE.

Reducing the Complexity of the IFDE/ITDE Structure

In the remaining embodiments, the terms "IFDE/ITDE equalizer" and "IFDE/ITDE structure" are sometimes used. An IFDE/ITDE equalizer is an equalizer that has an IFDE/ITDE structure. An IFDE/ITDE structure is a structure that is implemented as either the IFDE equalizer structure illustrated in FIG. 4 or the ITDE equalizer structure illustrated in FIG. 5. Whether the IFDE structure or the ITDE structure is used for detection and decoding a particular block of symbols depends upon the implementation. For example, the structure chosen may depend upon channel conditions. Both the IFDE structure and the ITDE structure operate in the same manner, with the difference being that one is implemented in the frequency domain and the other is implemented in the time domain. The general structure and operation is the same for both the IFDE structure and the ITDE structure: for an iteration i of the detection and decoding process, the input to the FEC decoder 108 is obtained from a combination, e.g. a subtraction, of a forward filter output and a backward filter output. The input to the forward filter is obtained from the received signal, and the input to the backward filter is obtained from the output of the FEC decoder 108 from the previous iteration i–1.

Although the IFDE/ITDE equalizer structure typically has lower computational complexity compared to SOVA or BCJR equalizers, it is still possible to further simply the implementation by imposing some assumptions that may both reduce the computational complexity and impose minimal impact on the performance. Any one, some, or all of the example modifications discussed below may be implemented in some embodiments. Also, the example modifications discussed below may be applied to the IFDE equalizer and/or the ITDE equalizer.

One Example Modification

As discussed above, the detection and decoding occurs over a plurality of iterations. Each iteration may be called a turbo loop, turbo iteration, or global loop. The total number of iterations used to detect and decode a symbol will be designated I, and a particular one of the iterations will be designated i, where i=1, . . . I. At each iteration i, the output of the FEC decoder 108 is fed back to the equalizer 114, which updates the input to the FEC decoder 108 in the next iteration.

In some embodiments, there is no a-priori information coming from the FEC decoder 108 in the first iteration i=1. Therefore, in the first iteration i=1, no backward filtering occurs and the equalizer 114 reduces to a MMSE equalizer, where the forward filter values are computed as $$w_n^{i=1} = \frac{\bar{g}_n^*}{\sigma^2 + |\bar{g}_n|^2}, n = 0, 1, \ldots, N-1.$$

The backward filter values $b_n^{i=1}$ do not need to be computed. Therefore, the complexity of the computations for iteration i=1 may be reduced compared to the complexity of the computations for the other iterations i>1.

Another Example Modification

Examining the equations describing the forward and backward filters reveals that re-calculation of these filters is necessary for every iteration i only because the FEC reliability parameter ρ may change every iteration. If ρ were instead fixed, then the parameters and filter taps of the IFDE or ITDE equalizer 114 may be calculated only once per detection/decoding of a block of symbols s. Computational complexity in implementing the IFDE or ITDE equalizer 114 may be significantly reduced compared to re-computing the parameters and filter taps every iteration, and performance degradation may be minimal. The calculations can be implemented one time during initialization phase and then kept constant for the entire signal processing of symbols s.

During turbo iterations, the FEC codeword output from the FEC decoder 108 should ideally converge to the correct transmitted codeword, otherwise, successful decoding may never occur. As a result, the value of ρ should ideally be close to one as the number of turbo iterations increases. Therefore, in some embodiments, ρ is fixed as ρ=1, though it could be fixed to any other value instead, e.g. ρ=0.9. If ρ is fixed as ρ=1, then some calculations may be further simplified, e.g.:

$$b_n^j = \frac{\lambda(\sigma^2 + |\bar{g}_n|^2) - \sigma^2}{\sigma^2}, n = 0, 1, \ldots, N-1$$

$$\text{where } \lambda = \sigma^2 \frac{\sum_{n=0}^{N-1} \frac{1}{(\sigma^2)}}{\sum_{n=0}^{N-1} \frac{\sigma^2 + |\bar{g}_n|^2}{(\sigma^2)}} = \sigma^2 \frac{1}{\sum_{n=0}^{N-1} \sigma^2 + |\bar{g}_n|^2} \text{ and}$$

$$(\eta^j)^2 = \frac{\sigma^2}{N} \sum_{n=0}^{N-1} \frac{|1+b_n^j|^2}{\sigma^2 + |\bar{g}_n|^2} - 1 + 2\gamma^j - (\gamma^j)^2.$$

Another Example Modification

In the case of QPSK signaling, the soft symbol generation uses the non-linear tan h function. In some embodiments, computation of the tan h function is replaced by an approximation, as follows: if x<–3 then tan h(x)=–1, else if x>3 then tan h(x)=1, else tan h(x)=x×(27+x×x)/(27+9×x×x). This may reduce computational complexity when implementing the IFDE and/or IFDE equalizer 114.

Enhanced IFDE/ITDE Equalizer

Additional modifications may be implemented in some embodiments, e.g. to try to further enhance the performance of the equalizer 114. The example modifications described below may be implemented instead of, or in additional to, one, some, or all of the example modifications and embodiments discussed above.

Figure 6:
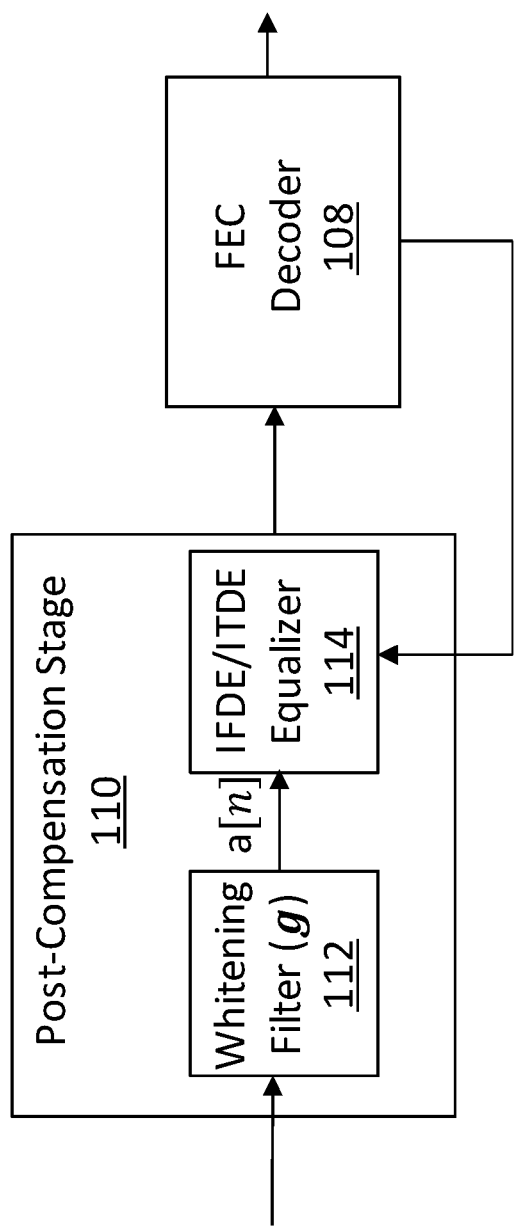
FIG. 6 is a block diagram of the post compensation and FEC decoder of FIG. 3, according to one embodiment.

FIG. 6 is a block diagram of the post compensation 110 and FEC decoder 108 of FIG. 3, and with the equalizer 114 implemented as an IFDE/ITDE equalizer 114. In FIG. 6, and in the remaining embodiments discussed and illustrated below, the tap calculator 116 will be omitted for clarity. However, in actual implementation, the tap calculator 116 would be included to compute the filter taps.

As discussed earlier, in some embodiments there is no a-priori information coming from the FEC decoder 108 in the first iteration i=1 of the turbo loop. Therefore, in the first iteration i=1, no backward filtering occurs and the IFDE/ITDE equalizer 114 reduces to a MMSE equalizer. To try to improve the performance of the IFDE/ITDE equalizer 114 when there is a limited number of turbo iterations, especially if the inter-symbol interference (ISI) increases, a modification may be made that aims to improve the structure for the first iteration. For example, in an optical transmission scenario, there may be a gap between BCJR equalizer error performance and IFDE/ITDE equalizer error performance that increases as the number of WSS's in the link increases. The result may be higher filtering impact and hence higher noise coloring at the output of the linear channel equalizer. One option to try to enhance the IFDE/ITDE equalizer 114 error performance for high ISI scenarios is to increase the number of turbo iterations. However, increasing the number of turbo iterations may diminish or eliminate the complexity savings of using the IFDE/ITDE equalizer 114. An alternative solution, discussed below, is to try to improve the structure of the IFDE/ITDE equalizer 114 for the first iteration, which may help reduce the gap between the error performance of a BCJR equalizer structure and the error performance of the IFDE/ITDE equalizer 114. In some embodiments, the modification of the IFDE/ITDE equalizer 114 involves providing LLRs values to the FEC decoder in the first iteration in order to improve the IFDE/ITDE performance for a given number of turbo iterations. The IFDE/ITDE structure is utilized from the second iteration onwards.

Figure 7:
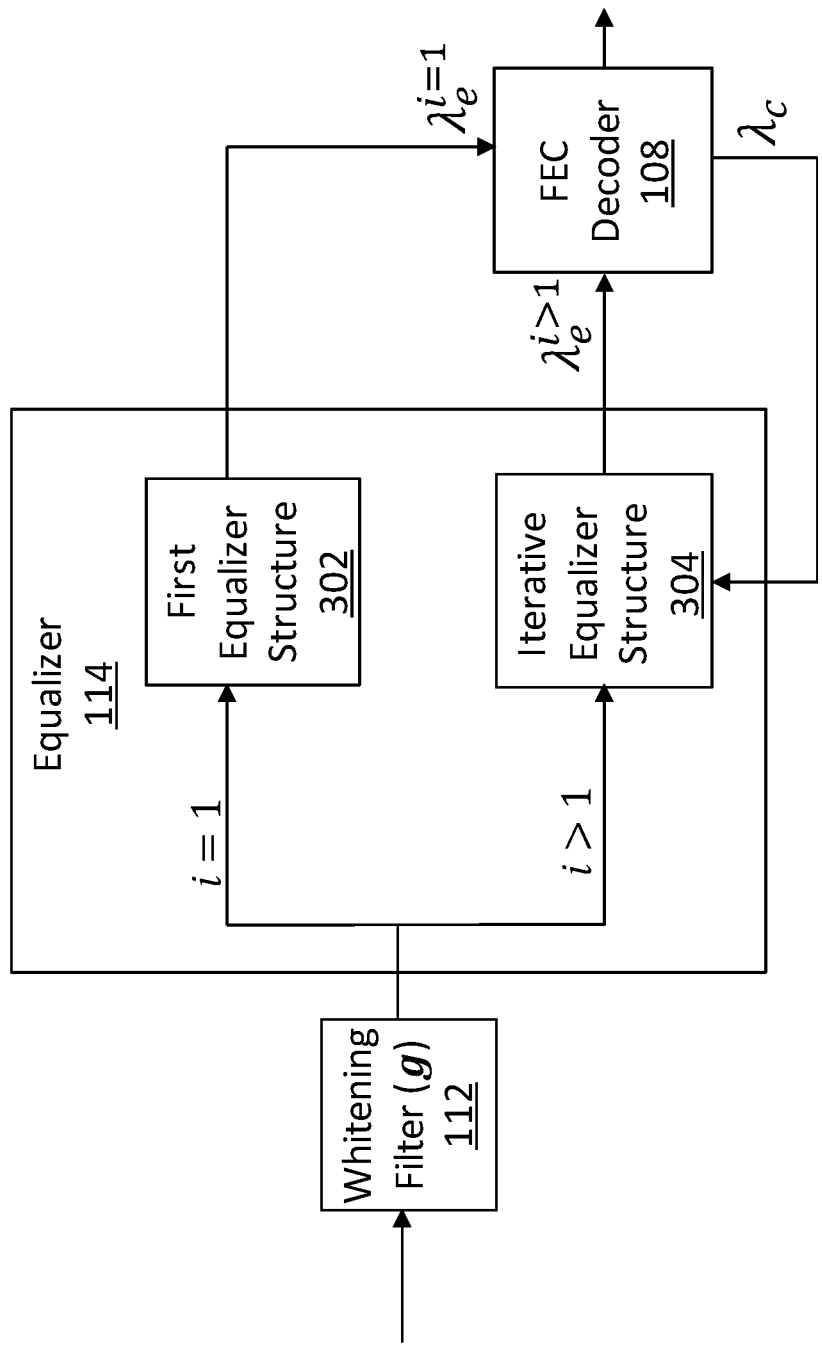
FIG. 7 is a block diagram of an equalizer and FEC decoder, according to another embodiment.

FIG. 7 is a block diagram of an equalizer 114 and FEC decoder 108, according to one embodiment. The equalizer 114 includes a first equalizer structure 302 and an iterative equalizer structure 304. The detection and decoding occurs over a plurality of iterations. The total number of iterations used to detect and decode a symbol is designated I, and a particular one of the iterations is designated i. In the first iteration i=1, the output of the whitening filter 112 is passed to the first equalizer structure 302, which performs equalization. The first equalizer structure 302 is different from the iterative equalizer structure 304. The equalization performed by the first equalizer structure 302 may use the results of decoding previous symbols, but (unlike the iterative equalizer structure 304), the equalization performed by the first equalizer structure 302 does not use the output of previous iterations of the detection and decoding process. Because it is the first iteration of the detection and decoding process, no output of a previous iteration of the detection and decoding process is available. The output of the first equalizer structure 302 ($\lambda_e^{i=1}$) is passed to the FEC decoder 108, which generates the FEC decoder output of the first iteration ($\lambda_c^{i=1}$). The remaining iterations of the detection and decoding process use the iterative equalizer structure 304.

The iterative equalizer structure 304 operates as follows: for an iteration i>1 of the detection and decoding process, the input to the FEC decoder 108 is obtained from a combination, e.g. a subtraction, of a forward filter output and a backward filter output. The input to the forward filter is obtained from the received signal, and the input to the backward filter is obtained from the output of the FEC decoder 108 from the previous iteration i−1. For each iteration i>1, the output of the FEC decoder for the previous iteration ($\lambda_c^{i-1}$) is used.

Figure 8:
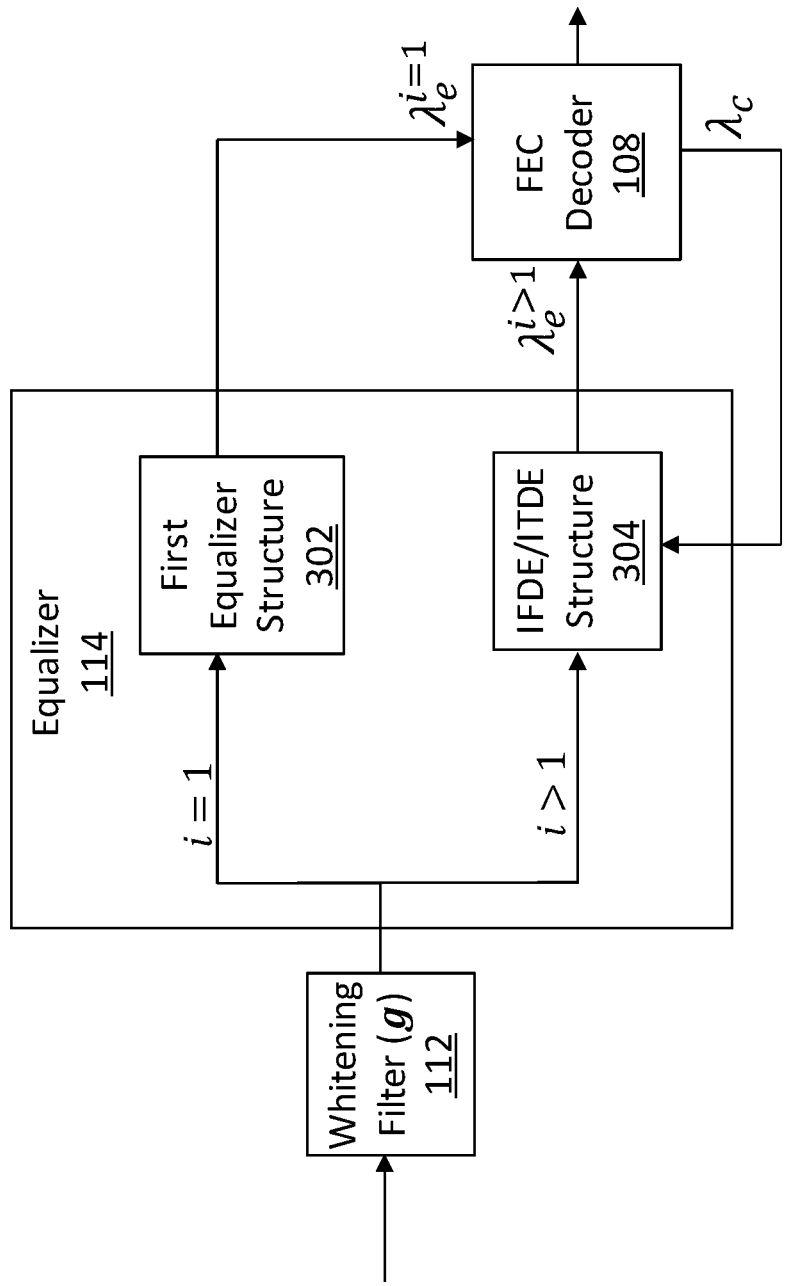
FIG. 8 illustrates the equalizer structure of FIG. 7 in which the iterative equalizer structure is implemented by an IFDE/ITDE structure.
Figure 9:
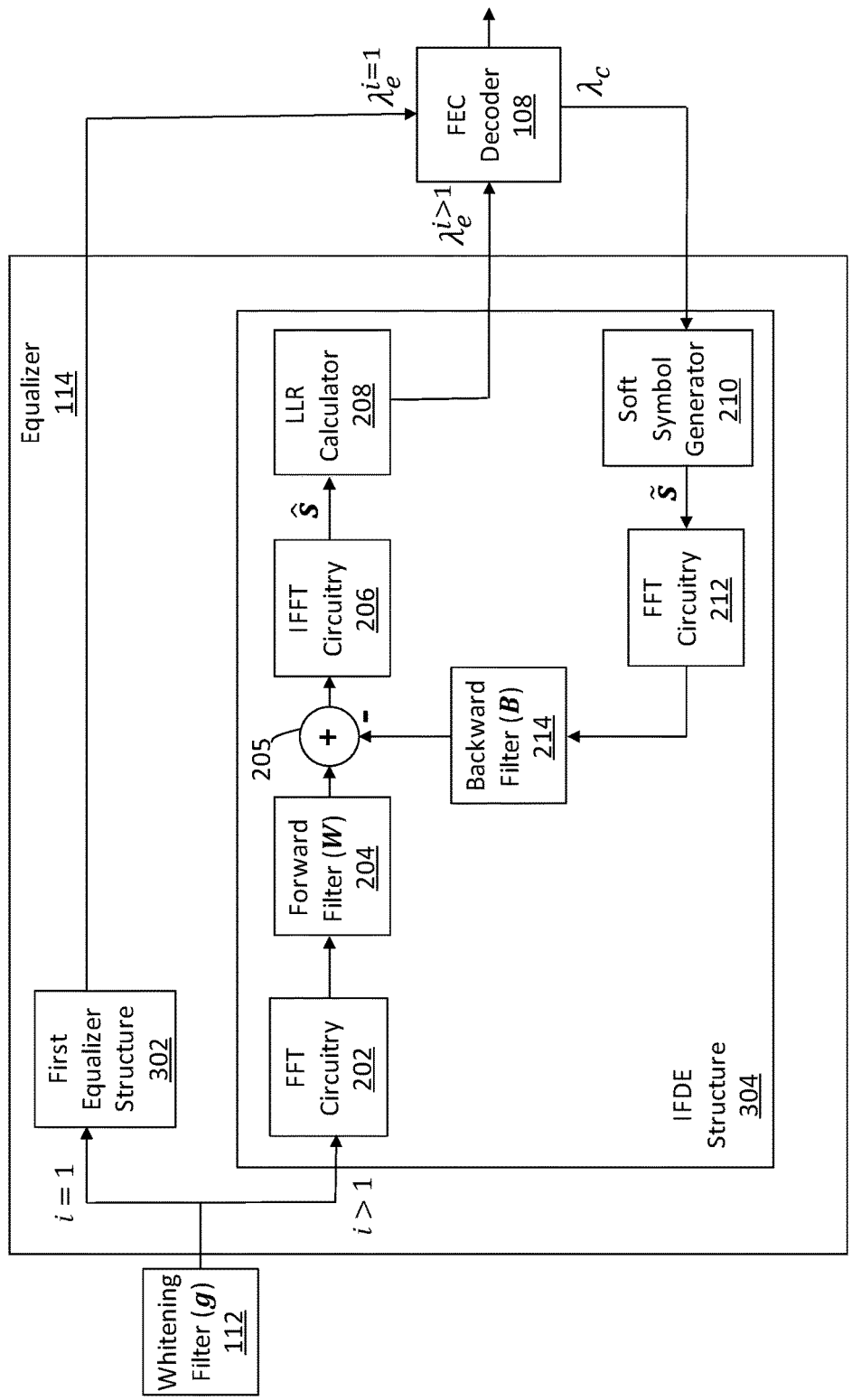
FIG. 9 illustrates the equalizer structure of FIG. 8 in which the IFDE/ITDE structure is implemented as an IFDE structure.

An example of an iterative equalizer structure 304 is the IFDE/ITDE structure. FIG. 8 illustrates the equalizer structure of FIG. 7 in which the iterative equalizer structure 304 is implemented by an IFDE/ITDE structure 304. In the remaining embodiments, an IFDE/ITDE structure will be used as the iterative equalizer structure 304, but in general this need not be the case. For completeness, FIG. 9 illustrates the equalizer structure of FIG. 8 in which the IFDE/ITDE structure 304 is implemented as an IFDE structure. Alternatively, the IFDE/ITDE structure may be implemented as an ITDE structure.

Figure 10:
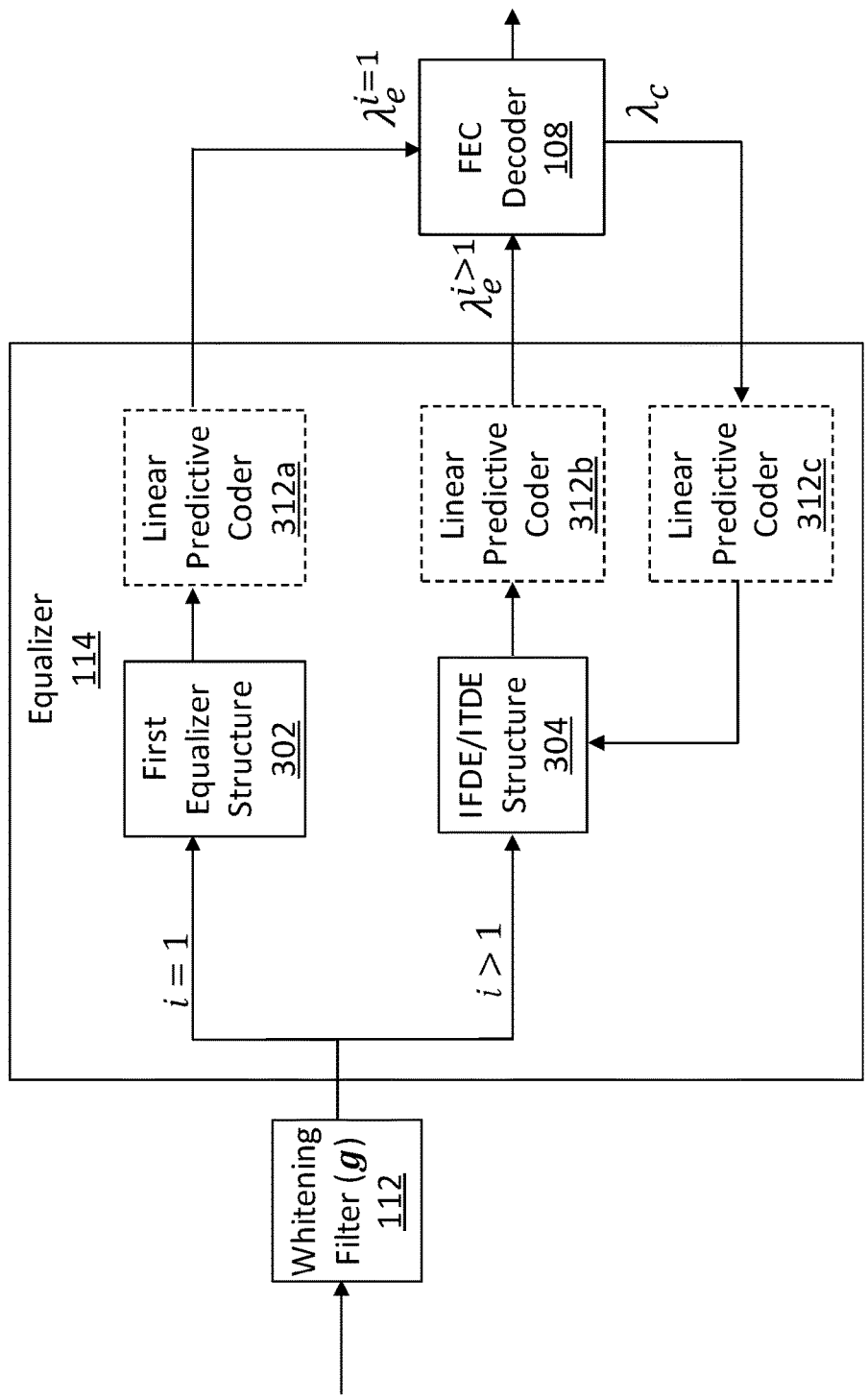
FIG. 10 illustrates a variation of FIG. 8 in which linear predictive coding (LPC) is illustrated as optionally being performed.

In some embodiments, linear predictive coding (LPC) may optionally be performed at various points within equalizer 114. FIG. 10 illustrates a variation of FIG. 8 in which LPC is illustrated as optionally being performed at three different places within equalizer 114. The LPC is performed by a linear predictive coder. Three linear predictive coders are illustrated in FIG. 10 and respectively labelled linear predictive coders 312a, 312b, and 312c. Any one, some, or all of the linear predictive coders 312a-c may be present.

LPC is the process of predicting a sample based on past samples. Because the noise samples are correlated, LPC can be used to try to predict current samples, and then subtract them from the received signal. In a mathematical form, the predicted noise samples can be written as $$\tilde{z}[n] = -q_1 z[n-1] - q_2 z[n-2] - \ldots - q_M z[n-M] + e[n]$$

where $q_1 \ldots q_M$ are taps of a prediction filter q, M is the order of the prediction filter, and e[n] is the $n^{th}$ element of the prediction error vector e. The optimal predictor that minimizes the mean square error (MSE) is the whitening filter. The LPC exploits the property that the noise in the received signal is colored, i.e. correlated, and so the LPC tries to estimate the noise samples, e.g. using the equation above.

Note that illustration of the linear predictive coders 312a-c in FIG. 10 is simplified for the purposes of clarity. For example, LPC acts on the noise samples, and so circuitry (not illustrated in FIG. 10) would be present to subtract the predicted symbol from the received signal before the result of this signal is provided to LPC to obtain the noise estimate. Additional circuitry (not illustrated in FIG. 10) could also be present to subtract, from the received signal, the estimated noise output from the LPC. Subtracting the estimated noise output of the LPC from the received signal provides an updated predicted symbol. This additional circuitry is illustrated in a later figure (FIG. 14) when describing an example in which the first branch (iteration i=1) of the equalizer 114 is implemented using a decision feedback equalizer/LPC block. Also, although the linear predictive coders 312a-c in FIG. 10 are illustrated as separate from the first equalizer structure 302 and IFDE/ITDE structure 304, they may be part of the first equalizer 302 structure and/or IFDE/ITDE structure 304. For example, LPC may occur prior to LLR computation.

The first equalizer structure 302 may be many possible different structures.

In some embodiments, the first equalizer structure 302 is a linear predictive coder, in which case additional linear predictive coder 312a would not be present.

In some embodiments, the first equalizer structure 302 is a non-liner equalizer. For example, the first equalizer structure 302 may be a BCJR equalizer. As another example, the first equalizer structure 302 may be a decision feedback equalizer (DFE).

Figure 11:
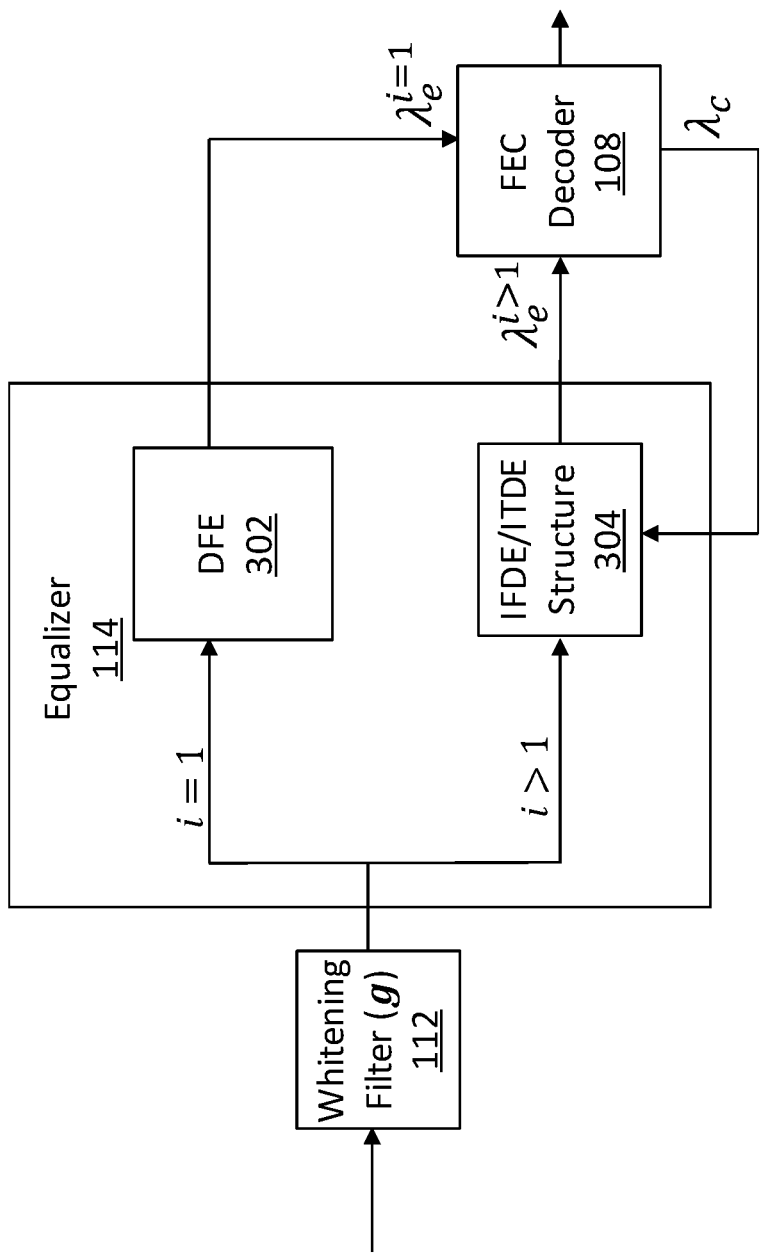
FIG. 11 illustrates the equalizer of FIG. 8, in which the first equalizer structure is a decision feedback equalizer (DFE)
Figure 12:
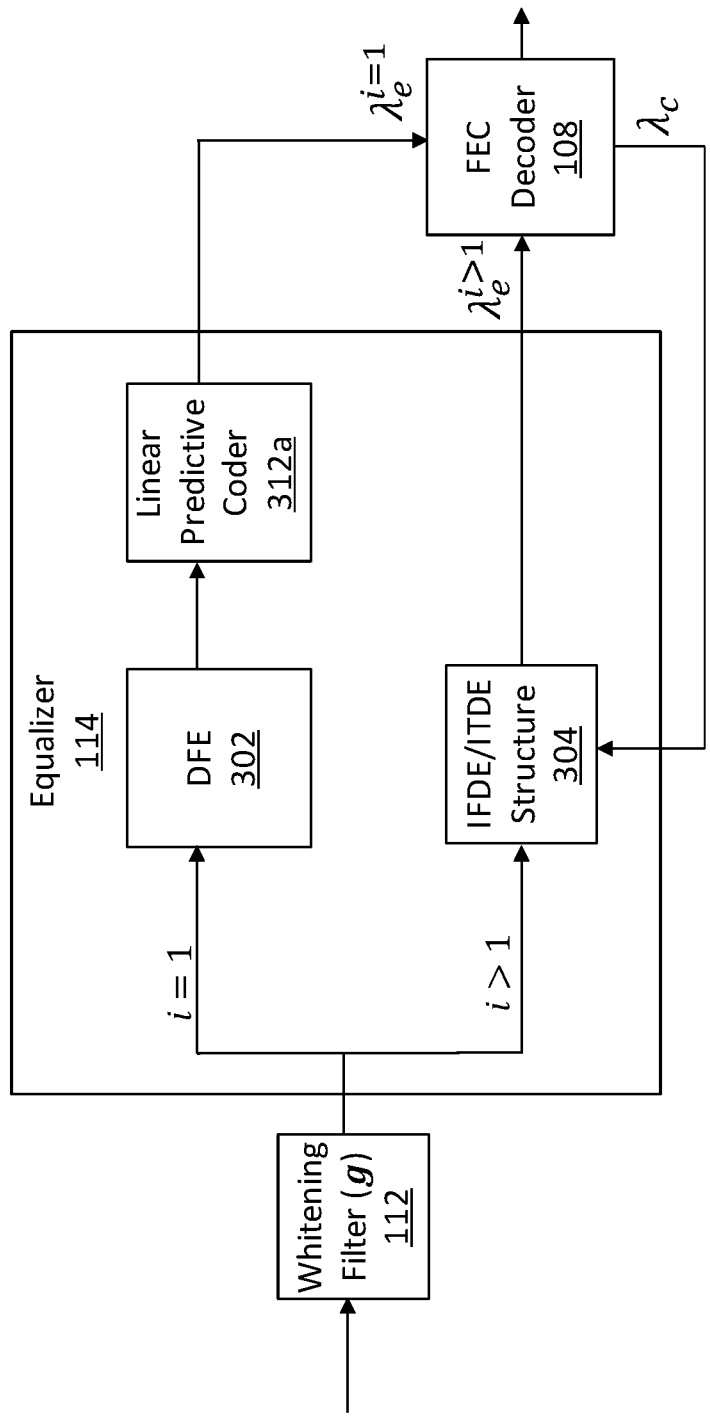
FIG. 12 illustrates a variation of FIG. 11 in which optional LPC is present.

FIG. 11 illustrates the equalizer 114 of FIG. 8, in which the first equalizer structure is a DFE 302. FIG. 12 illustrates a variation of FIG. 11 in which optional LPC is present as linear predictive coder 312a.

Figure 13:
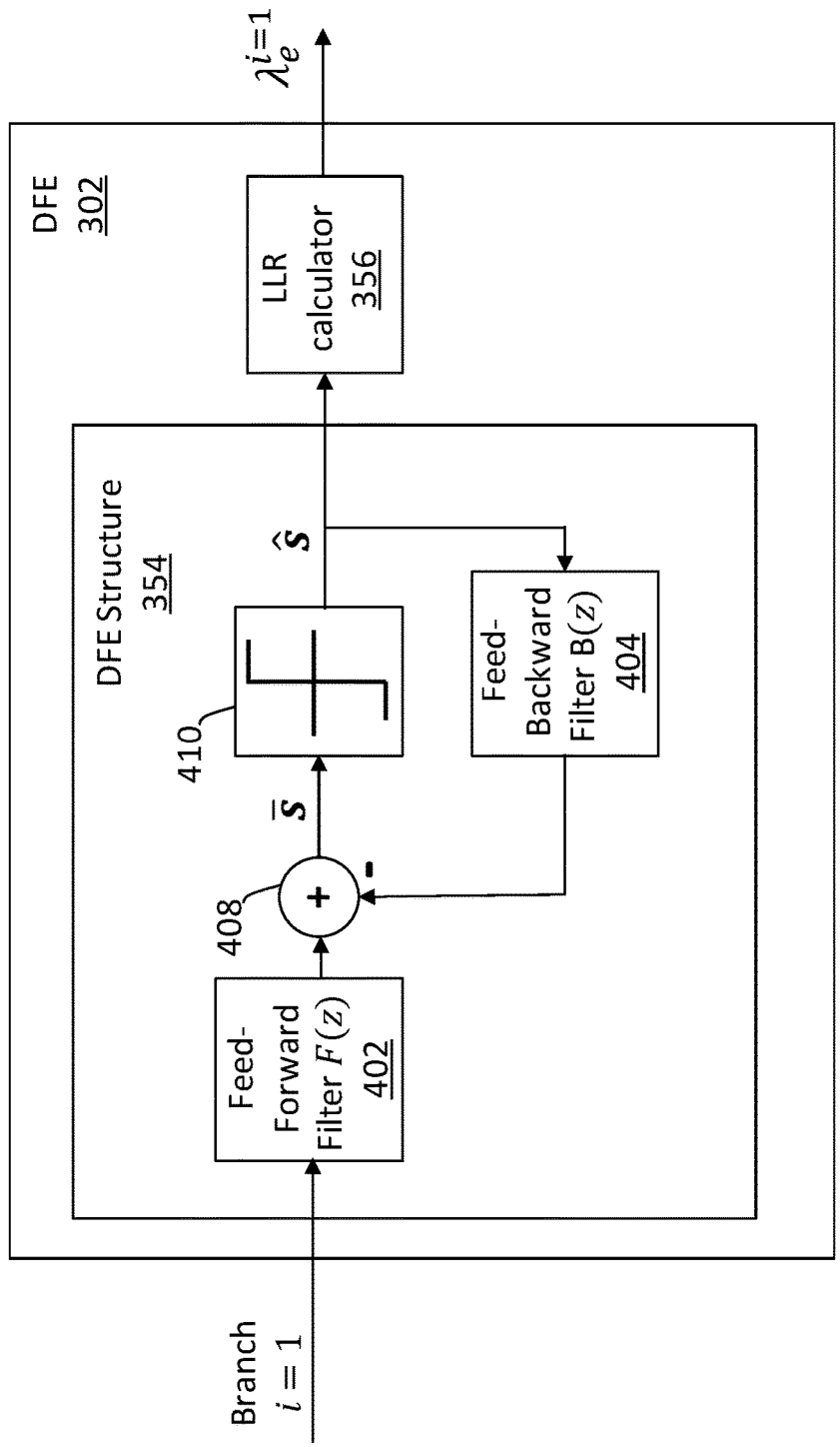
FIG. 13 illustrates an example implementation of a DFE, according to one embodiment.

FIG. 13 illustrates an example implementation of the DFE 302, according to one embodiment. The basic principle of the DFE 302 is that the estimation of the current symbol is dependent on the estimation of the previously decided symbols. The DFE 302 includes a DFE structure 354 and an LLR calculator 356. The input to the DFE structure 354 is passed to a feed-forward filter (FFF) 402. The output of the FFF 402 is combined with the output of a feed-backward filter (FBF) 404 via combiner 408. For example, the output of the FBF 404 may be subtracted from the output of the FFF 402, in which case the combiner 408 is circuitry or a processor to subtract the two signals. The output $\bar{s}$ of the combiner 408 is passed to a slicer 410, which maps the signal $\bar{s}$ to the nearest symbol $\hat{s}$ in the constellation. The output of the FBF 404 is a weighted linear combination of previously detected symbols. If linear predictive coder 312a is present, then in some embodiments the LLR calculator 356 may instead be placed after the linear predictive coder 312a.

DFE equalization is a nonlinear equalization that may exhibit improved performance to linear channel equalizers, especially in severely distorted channels with roots close to the unit circle. The DFE structure 354 may therefore be used in order to try to generate more reliable estimates of the received symbols for the first iteration of turbo equalization, and LLRs values are computed and passed to the FEC decoder 108. The signal after the whitening filter 112 may be written as a $$a[n] = \sum_{m=0}^{M-1} g[m]s[n-m] + \hat{z}[n] \text{ or } = Gs + \hat{z}.$$

The DFE processes the filtered message a[n] and provides an estimate for s[n] using the DFE structure 354 shown in FIG. 13.

The DFE structure 354 has the two main filters described above: FFF 402 F(z) and the FBF 404 B(z). Both filters are optimized based on the MMSE criterion. Writing the equation for the estimated symbol before the slicer input $\bar{s}$, and if the previous decisions are correct:

$$\bar{s}[n] = \sum_{k=1}^{L_F} f[k]a[n-k] - \sum_{k=1}^{L_B} b[k]\hat{s}[n-k].$$

Here, f[k] and b[k] are the time-domain representations of $$F(z) = \sum_k f[k]z^{-k}, \text{ and } B(z) = \sum_k b[k]z^{-k},$$

respectively. $L_F$ and $L_B$ denote the number of taps for the FFF and FBF respectively.

Solving for F(z) and B(z), results in $$f = (\Phi_{gg} - GG^H) + \sigma^2 I)^{-1}g,$$

and $$b = G^H f,$$

where $\Phi_{gg}$ is the autocorrelation matrix of the whitening filter 112 g, $\sigma^2$ is the noise variance, and I is the identity matrix.

Though the output of the DFE structure 354 may provide better estimates of the received symbols, there may be an additional improvement by exploiting the noise correlation existing in the equalized signal before applying the whitening filter 112 g.

Returning to FIG. 12, and when linear predictive coder 312a is present, then in the first iteration (i=1) where no a-priori information from the FEC decoder 108 is available, the block-based IFDE/ITDE equalizer has been replaced with a symbol-by-symbol DFE, followed by LPC. In the subsequent iterations (i>1), where a-priori information from the FEC decoder 108 is available, IFDE/ITDE is used as discussed before. Depending on the transmission and system parameters, such as modulation format or number of iterations, the linear predictive coder 312b optionally may be used after the IFDE/ITDE structure 304 (as illustrated in FIG. 10) or before the IFDE/ITDE structure 304. Also, in some embodiments, only the DFE or the linear predictive coder may be used as the first equalizer structure 302 in the path for the first iteration to calculate a-priori information for the first turbo iteration.

Figure 14:
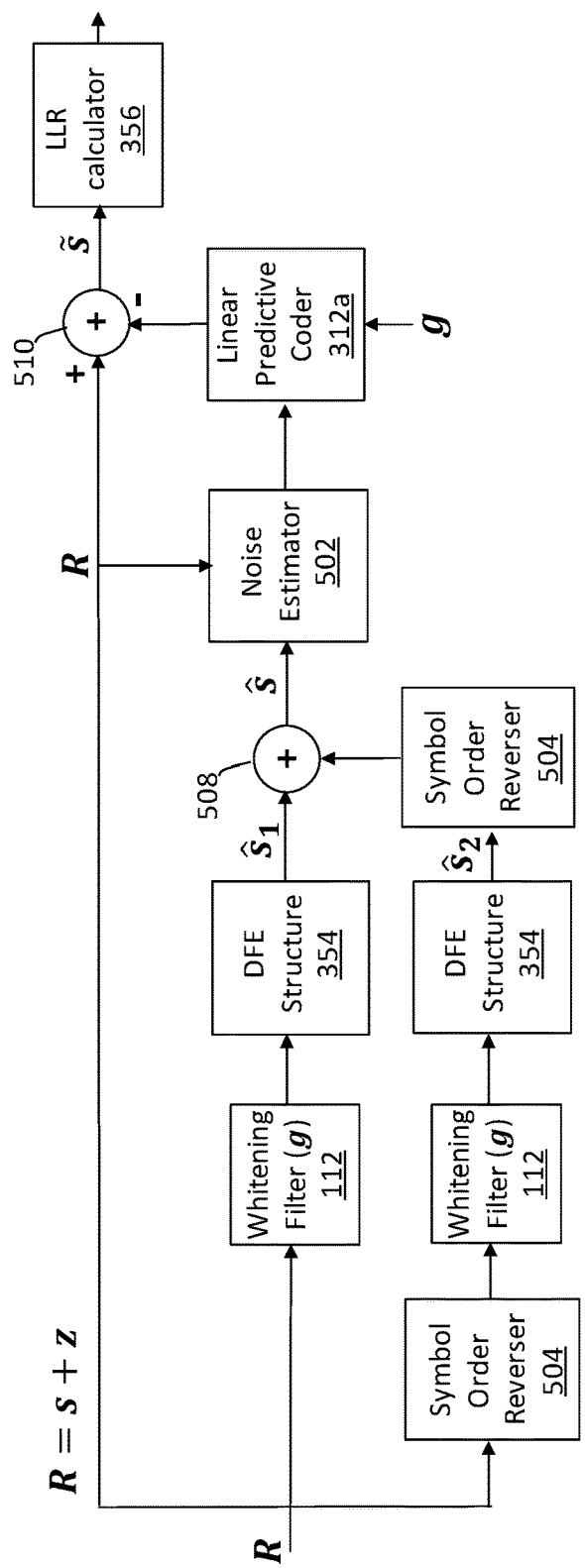
FIG. 14 illustrates an example implementation of a DFE, according to one embodiment.

FIG. 14 illustrates an example implementation of DFE 302, according to another embodiment. The DFE 302 in FIG. 14 is a bi-directional DFE because one DFE structure works in the forward direction and the other DFE structure works in the reverse direction. The incorporation of linear predictive coder 312a is also illustrated, and so the illustrated structure may be referred to as a DFE-LPC block. The whitening filter 112 is also illustrated.

In operation, a signal R is received, e.g. from linear equalizer 106 (illustrated in FIG. 3). The received signal includes a block of symbols s to be detected and decoded, as well as coloured noise z, i.e. R=s+z. The received signal is filtered using the whitening filter 112 g. The filtered message is equalized using a DFE structure 354 to obtain an estimated signal $\hat{s}_1$. In parallel, the received signal R is reversed by symbol order reverser 504, which reverses the order of the received samples of R such that the first sample representing the first symbol becomes the last sample in the block of samples. For example, if R consisted of a block of N samples $r_0$ to $r_{N-1}$, each one corresponding to a respective one of N symbols, then the input to the symbol order reverser 504 is $[r_0, r_1, \ldots, r_{N-2}, r_{N-1}]$, and the output of the symbol order reverser 504 is $[r_{N-1}, r_{N-2}, \ldots r_1, r_0]$. The output of the symbol order reverser 504 is filtered using the whitening filter 112 g, and then equalized using a DFE structure 354 to obtain an estimated signal $\hat{s}_2$. Note that if the taps of the whitening filter 112 happen to be complex, then in the reverse direction the whitening filter is actually conjugate, i.e. conj(g), not g as illustrated. The estimated signal $\hat{s}_2$ is passed to another symbol order reverser 504 to again reverse the samples to undo the reversing previously done, i.e. $[\hat{s}_{2,N-1}, \hat{s}_{2,N-2}, \ldots \hat{s}_{2,1}, \hat{s}_{2,0}]$ goes to $[\hat{s}_{2,0}, \hat{s}_{2,1}, \ldots \hat{s}_{2,N-2}, \hat{s}_{2,N-1}]$. The concept of flipping the sequence order is described, for example in J. K. Nelson, A. C. Singer, U. Madhow and C. S. McGahey, "BAD: bidirectional arbitrated decision-feedback equalization," in *IEEE Transactions on Commun.*, vol. 53, no. 2, pp. 214-218, February 2005.

The two estimates $\hat{s}_1$ and reversed $\hat{s}_2$ are then combined using combiner 508 to generate estimate $\hat{s}$. For example, the combiner 508 may obtain an average of $\hat{s}_1$ and reversed $\hat{s}_2$, e.g. $\hat{s} = (\hat{s}_1 + \text{reversed } \hat{s}_2)/2$, in which case the combiner 508 is implemented by circuitry and/or a processor that adds two inputs and divides the result by two. The generated estimate sequence $\hat{s}$ may have a better quality, e.g. in terms of closer Euclidean distances to the original sequence s, compared to the received signal R. The generated estimate sequence $\hat{s}$ is then passed to noise estimator 502 to obtain a coarse estimate of noise values by subtracting the hard decision or soft decision estimates of $\hat{s}$ from the received signal R, e.g. Noise estimate=R−f($\hat{s}$), where f($\hat{s}$) is a function of $\hat{s}$ and in some embodiments f($\hat{s}$)=$\hat{s}$. The estimated noise is then passed to linear predictive coder 312a to perform LPC and thereby try to generate a better estimate of the noise values. The updated noise estimate output from the linear predictive coder 312a is then subtracted from the received signal R via combiner 510 to generate the symbol estimates $\tilde{s}$. The symbol estimates $\tilde{s}$ are then passed to the LLR calculator 354.

Benefits

In some embodiments above, an efficient low-complexity turbo decoder is presented based on the principles of symbol-based decision feedback equalization, block-based decision feedback equalization and LPC. An important element of some embodiments is a block-based decision feedback equalization implemented in the frequency domain that works iteratively with a FEC decoder, and which has been called Iterative Frequency Domain equalization (IFDE). In order to try to improve performance of the iterative equalization, some embodiments include additional components, e.g. symbol-based decision feedback equalization and LPC, and the improved structure may be called Enhanced Iterative Frequency Domain equalization (E-IFDE).

In some embodiments, a turbo equalization design is disclosed that may achieve comparable performance to optimal methods, but with a more efficient implementation. The design is shown in the frequency domain as the IFDE described earlier, as well as the time-domain equivalent ITDE described earlier.

In some embodiments, the IFDE/ITDE structure discussed above can effectively replace BCJR/MLSE for a QAM constellation, with linear complexity order in constellation size and post-filter tap length. In some embodiments, with higher post-filter tap length, the IFDE/ITDE structure may even outperform BCJR with limited number of taps. In some embodiments, and with efficient implementation, a larger number of turbo iterations is feasible compared to BCJR because there is no delay of trellis with forward recursion and backward recursion.

To enhance the detection and decoding design, in some embodiments several modifications are provided to improve performance and simplify design, e.g. to make the circuit amenable for practical implementation. These modifications include considerations for practical implementation and also the implementation of symbol-based time domain DFE and LPC to provide soft estimates to the turbo loop during the first iteration where no a-priori information is fed back by the FEC decoder. In addition, the modifications still exhibit relatively low complexity and may be implemented as stand-alone low-complexity equalization techniques for systems that do not implement the turbo-detection principle or require low complexity/power implementations.

In some embodiments, the IFDE/ITDE structure and enhanced designs discussed above may act as efficient non-linear equalizers for turbo equalization. Implementation of an efficient turbo equalizer with reasonable complexity and comparable performance to the optimal BCJR equalizer may be possible. A combination of symbol-based and block-based DFE may be used to improve the performance of the turbo detection and exhibit reduced implementation resources compared to the optimal BCJR equalizer. A key difference between the BCJR equalizer and some embodiments of the present invention is that some embodiments of the present invention have a complexity that is only linear in the channel memory and the constellation. Unlike the BCJR equalizer, some embodiments of the present invention are based on symbol demapping instead of trellis decoding. Some embodiments of the present invention provide a reduced complexity realization of a channel equalizer that has similar properties to the optimal, yet complex, BCJR equalizer. Further improvements to performance may be possible by using the optional LPC. In implementation, flexible turbo detection/decoding may be possible by selecting any one of the disclosed channel equalizers to compromise between performance and complexity, e.g. power.

A comparison between the BCJR equalizer and an embodiment of the enhanced IFDE (E-IFDE) disclosed in some embodiments above is as follows. The BCJR equalizer is an optimal symbol-by-symbol equalizer, but requires high implementation complexity. The E-IFDE is sub-optimal, but has a linear complexity as a function of constellation size and number of filter taps. The BCJR equalizer generates the LLRs by moving on the trellis without noise amplification. The E-IFDE filters the received signal and performs soft reconstruction of symbols in order to generate the LLRs. The BCJR may be practically implemented for small constellations, e.g. QPSK and 16QAM, for few number of channel taps, e.g. 3 or 4 taps, if separate I/Q processing. The E-IFDE may be practically implemented for larger constellations and for larger number of channel taps, e.g. 7 taps, for separate and complex processing.

As discussed earlier, the proposed solutions discussed herein are not limited to a receiver in an optical system and can be used in other systems, e.g. microwave system as well. After the MIMO equalizer and all the related received signal processing is done, the disclosed turbo detection and decoding structure can be implemented to try to provide improved performance without requiring large amounts of additional resources or power consumption. Therefore, in some embodiments, the proposed solutions discussed herein may be implemented in any receiver that has a turbo loop, e.g. an optical coherent receiver or a microwave receiver.

Methods and General Embodiments

Figure 15:
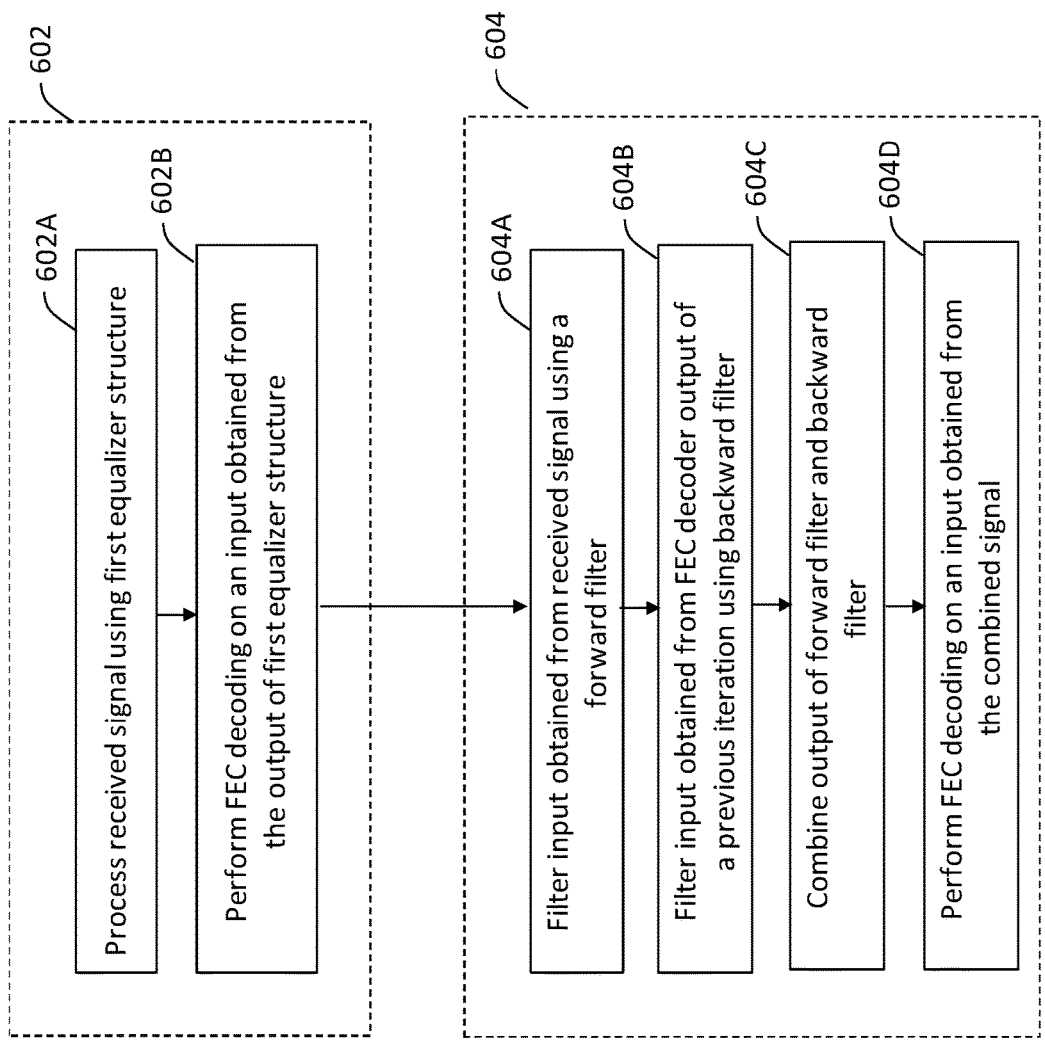
FIG. 15 is a block diagram of method performed by a receiver, according to one embodiment.

FIG. 15 is a block diagram of a method performed by a receiver (e.g. the receiver 102) according to one embodiment. The method is performed during detection and decoding of a block of symbols over a plurality of iterations. The receiver includes at least a FEC decoder (e.g., FEC decoder 108), a first equalizer structure (e.g. first equalizer structure 302), and an iterative equalizer structure (e.g. iterative equalizer structure 304). The iterative equalizer structure is typically different from the first equalizer structure, although this is not necessary. The iterative equalizer structure could be the same as the first equalizer structure in some embodiments. For example, the IFDE/ITDE structure may be used in all iterations i≥1 in some embodiments.

In step 602, a first iteration i=1 of the detection and decoding is performed, which includes steps 602A and 602B. In step 602A, the first equalizer structure processes a received signal carrying the symbols to generate an output. For example, the received signal carrying the symbols may be the output of a whitening filter, e.g. whitening filter 112, or obtained from the output of the whitening filter. In step 602B, the FEC decoder performs FEC decoding on an input obtained from the output of the first equalizer structure.

In step 604, one or more other iterations i>1 of the detection and decoding is performed. In some embodiments, during each one of the one or more other iterations, steps 604A to 604D are performed. In step 604A, a forward filter of the iterative equalizer structure filters an input obtained from the received signal. For example, the received signal may be the output of a whitening filter, e.g. whitening filter 112. In step 604B, a backward filter of the iterative equalizer structure filters an input obtained from an output of the FEC decoder from a previous iteration of the detection and decoding. In step 604C, an output of the forward filter is combined with an output of the backward filter to obtain a combined signal. In some embodiments, the combining comprises subtracting the output of the backward filter from the output of the forward filter, but this is not necessary. For example, another operation may be performed instead, such as addition. In step 604D, the FEC decoder performs FEC decoding on an input obtained from the combined signal.

Note that the iterative equalizer structure does not necessarily have to include a forward filter and/or a backward filter and/or a combiner. More generally, in step 604, during each one of the one or more other iterations i>1 of the detection and decoding: (i) the input to the FEC decoder is obtained from an output of the iterative equalizer structure; (ii) one input to the iterative equalizer structure is obtained from the received signal; and (iii) another input to the iterative equalizer structure is obtained from an output of the FEC decoder from a previous iteration of the detection and decoding. The output of the iterative equalizer structure may be based on the output of a combiner, but this is not necessary. The input obtained from the received signal may be filtered by a forward filter, but this is not necessary. The input obtained from the output of the FEC decoder from the previous iteration of the detection and decoding may be filtered by a backward filter, but this is not necessary.

In some embodiments, the method in step 604 includes computing at least one LLR value of an input obtained from the combined signal, and performing the FEC decoding using the at least one LLR value. In some embodiments, the method in step 604 includes mapping the output of the FEC decoder to at least one symbol. In some embodiments, the input to the backward filter is obtained from the at least one symbol.

In some embodiments, in step 604, i.e. during each one of the one or more other iterations i>1 of the detection and decoding, the method may further include applying a DFT to the received signal to obtain a first Fourier transformed signal, and using the first Fourier transformed signal as the input to the forward filter. An example of applying the DFT is FFT circuitry 202. The method may further include applying an inverse DFT to the combined signal to obtain an inverse Fourier transformed signal, and computing the at least one LLR value from the inverse Fourier transformed signal. An example of applying the inverse DFT is IFFT circuitry 206. The method may further include applying the DFT to the at least one symbol mapped from the output of the FEC decoder to obtain a second Fourier transformed signal, and using the second Fourier transformed signal as the input to the backward filter. An example of applying this DFT is FFT circuitry 212.

In some embodiments, linear predictive coding may be performed prior to the FEC decoding, e.g. in the first iteration i=1 of the detection and decoding.

In some embodiments, the first equalizer structure can have a number of different structures, as described earlier, e.g. the first equalizer structure may be a linear predictive coder or a BCJR equalizer, or a DFE. In some embodiments, if the first equalizer structure is a DFE, the DFE may include a feed-forward filter (e.g. feed-forward filter 402) and a feed-backward filter (e.g. feed-backward filter 404). During step 602, i.e. during the first iteration i=1 of the detection and decoding, the method may include: the feed-forward filter filtering an input of the DFE; the feed-backward filter generating an output, e.g. using at least one previously detected symbol; combining (e.g. using a combiner such as combiner 408) an output of the feed-forward filter with the output of the feed-backward filter to obtained a second combined signal; and obtaining at least one estimated symbol from the second combined signal, e.g. using a slicer, such as slicer 410. In some embodiments, step 602 my further include computing at least one LLR value from the at least one estimated symbol, and performing the FEC decoding using the at least one LLR value. An example of computing the at least one LLR value is LLR calculator 356 in FIG. 13.

In some embodiments, if the first equalizer structure is a DFE, the DFE may include a first DFE structure and a second DFE structure, where each one of the first DFE structure and the second DFE structure includes: a feed-forward filter to receive and filter an input; a feed-backward filter to generate an output, e.g. using at least one previously detected symbol; a combiner to combine an output of the feed-forward filter with the output of the feed-backward filter; and a slicer to obtain a block of estimated symbols from an output of the combiner. An example of a DFE structure is DFE structure 354. During step 602, i.e. during the first iteration i=1 of the detection and decoding, the method may include: the first DFE structure processing a first block of samples to output a first block of estimated symbols $\hat{s}_1$; the second DFE structure processing a second block of samples to output a second block of estimated symbols $\hat{s}_2$, where the second block of samples are a reverse of the first block of samples; reversing the second block of estimated symbols $\hat{s}_2$ to obtain a reversed second block of estimated symbols, and combining the first block of estimated symbols $\hat{s}_1$ with the reversed second block of estimated symbols to obtain an updated block of estimated symbols. An example is illustrated in FIG. 14. In some embodiments, step 602 further includes computing at least one LLR value from the updated block of estimated symbols, and performing the FEC decoding using the at least one LLR value. In some embodiments, prior to performing the FEC decoding, linear predictive coding is performed on noise samples to modify the updated block of estimated symbols. An example is illustrated in FIG. 14.

Many different receiver structures are disclosed herein. In one embodiment, e.g. as in FIG. 7, a receiver includes an equalizer and a FEC decoder to perform detection and decoding of a block of symbols over a plurality of iterations. The equalizer may include: (i) a first equalizer structure for use during a first iteration i=1 of the detection and decoding, and (ii) an iterative equalizer structure for use during one or more other iterations i>1 of the detection and decoding. The iterative equalizer structure may be different from the first equalizer structure, although this is not necessary. In some embodiments, the iterative equalizer structure includes a forward filter, a backward filter, and a combiner to combine an output of the forward filter with an output of the backward filter. An example of the iterative equalizer structure is the IFDE/ITDE structure. However, a forward filter and/or backward filter and/or combiner is not necessary.

In some embodiments, during the first iteration i=1 of the detection and decoding: an input to the first equalizer structure is obtained from a received signal carrying the symbols, and an input to the FEC decoder is obtained from an output of the first equalizer structure. The received signal carrying the symbols may be the output of a whitening filter (e.g. whitening filter 112) or derived from an output of a whitening filter, but this need not be the case, e.g. if whitening filter 112 was not present.

In some embodiments, during each one of the one or more other iterations i>1 of the detection and decoding: the input to the FEC decoder is obtained from an output of the iterative equalizer structure; one input to the iterative equalizer structure is obtained from the received signal; and another input to the iterative equalizer structure is obtained from an output of the FEC decoder from a previous iteration of the detection and decoding. If the iterative equalizer structure happens to include a forward filter, a backward filter, and a combiner to combine an output of the forward filter with an output of the backward filter, then: the input to the FEC decoder may be obtained from the output of the combiner; an input to the forward filter may be obtained from the received signal; and an input to the backward filter may obtained from the output of the FEC decoder from the previous iteration of the detection and decoding.

In some embodiments, the combiner includes, or is implemented by, circuitry to subtract the output of the backward filter from the output of the forward filter to obtain the output of the combiner. However, subtraction is not necessary. In some embodiments, the combining may be addition or averaging instead, as an example.

In some embodiments, an LLR calculator is interposed between the combiner and FEC decoder. An example is LLR calculator 208 interposed between combiner 205 and FEC decoder 108. An input of the LLR calculator is obtained from the output of the combiner, and the input to the FEC decoder is obtained from at least one LLR value computed by the LLR calculator.

In some embodiments, a symbol generator is interposed between the FEC decoder and the backward filter. An example is soft symbol generator 210, which is interposed between FEC decoder 108 and backward filter 214. The symbol generator is to map the output of the FEC decoder to at least one symbol, and the input to the backward filter is obtained from the at least one symbol.

In some embodiments, the iterative equalizer structure includes first DFT circuitry to apply the DFT to the received signal to obtain a first Fourier transformed signal that is input to the forward filter. An example is FFT circuitry 202. In some embodiments, the iterative equalizer structure includes inverse DFT circuitry interposed between the combiner and the LLR calculator to apply the inverse DFT to the output of the combiner and thereby provide an inverse Fourier transformed signal to the LLR calculator. An example is IFFT circuitry 206. In some embodiments, the iterative equalizer structure includes second DFT circuitry interposed between the symbol generator and the backward filter to apply the DFT to the output of the symbol generator and thereby provide a second Fourier transformed signal that is input to the backward filter. An example is FFT circuitry 212.

In some embodiments, the receiver further includes one or more linear predictive coders, e.g. a linear predictive coder prior to the FEC decoder, such as linear predictive coder 312*a* or 312*b*. A linear predictive coder may be interposed between the first equalizer structure and the FEC decoder, e.g. as in linear predictive coder 312*a*.

The first equalizer structure may be different structures, e.g. a linear predictive coder or a BCJR equalizer or a DFE. If the first equalizer structure is a DFE, then the DFE may include: a feed-forward filter to receive and filter an input of the DFE; a feed-backward filter to generate an output, e.g. using at least one previously detected symbol; a second combiner to combine an output of the feed-forward filter with the output of the feed-backward filter; and a slicer to obtain at least one estimated symbol from an output of the second combiner. An example is DFE 302 in FIG. 13. In some embodiments, the receiver may further include an LLR calculator interposed between the slicer and the FEC decoder, e.g. LLR calculator 356. An input of the LLR calculator is obtained from the output of the slicer, and the input to the FEC decoder is obtained from at least one LLR value computed by the LLR calculator.

In some embodiments, the DFE may include: a first DFE structure and a second DFE structure, where each one of the first DFE structure and the second DFE structure includes: a feed-forward filter to receive and filter an input; a feed-backward filter to generate an output, e.g. using at least one previously detected symbol; a second combiner to combine an output of the feed-forward filter with the output of the feed-backward filter; and a slicer to obtain a block of estimated symbols from an output of the second combiner. The DFE may further include a first symbol order reverser and a second symbol order reverser, where each one of the first symbol order reverser and the second symbol order reverser is to reverse the order of a sequence of inputs. The DFE may further include a third combiner (e.g. combiner 508) to combine a first input of the third combiner with a second input of the third combiner. The DFE may be configured to: receive a first block of samples at the first DFE structure and output a first block of estimated symbols $\hat{s}_1$; receive a second block of samples at the second DFE structure and output a second block of estimated symbols $\hat{s}_2$, where the second block of samples are obtained from a reverse of the first block of samples using the first symbol order reverser; reverse the second block of estimated symbols $\hat{s}_2$ using the second symbol order reverser to obtain a reversed second block of estimated symbols; receive the first block of estimated symbols $\hat{s}_1$ at the first input of the third combiner and receive the reversed second block of estimated symbols at the second input of the third combiner, and combine the first block of estimated symbols si with the reversed second block of estimated symbols to obtain an updated block of estimated symbols. An example is the DFE in FIG. 14.

In some embodiments, there may further be an LLR calculator interposed between the third combiner and the FEC decoder, e.g. LLR calculator 356 of FIG. 14, where an input of the LLR calculator is obtained from the updated block of estimated symbols output from the third combiner (e.g. combiner 508), and where the input to the FEC decoder is obtained from at least one LLR value computed by the LLR calculator.

In some embodiments, the receiver may further include a linear predictive coder interposed between the output of the third combiner and the input of the LLR calculator, where the liner predictive coder is to perform linear predictive coding on noise samples to modify the updated block of estimated symbols. An example is linear predictive coder 312*a* in FIG. 14.

The components discussed in all embodiments above, including the receive filter 104, the linear equalizer 106, the FEC decoder 108, the whitening filter 112, the equalizer 114, the tap calculator 116, the DFT circuitry 202/212, the IDFT circuitry 206, the LLR calculator 208, the forward filter 204/204A, the backward filter 214/214A, the filter point calculator 216/216A, the soft symbol generator 210, the combiner 205, the first equalizer structure 302, the iterative equalizer structure 304, the IFDE/ITDE structure 304, the linear predictive coders 312*a-c*, the DFE 302, the feed-forward filter 402, the combiner 408, the slicer 410, the feed-backward filter 404, the LLR calculator 356, the DFE structure 354, the noise estimator 502, the symbol order reverser 504, and/or the combiner 508 may each be implemented in the form of circuitry. In some implementations, the circuitry includes a memory and one or more processors that execute instructions stored on the memory. When the one or more processors execute the instructions, it causes the one or more processors to perform the operations of some or all of the components above, e.g. the operations of the receive filter 104, the linear equalizer 106, the FEC decoder 108, the whitening filter 112, the equalizer 114, the tap calculator 116, the DFT circuitry 202/212, the IDFT circuitry 206, the LLR calculator 208, the forward filter 204/204A, the backward filter 214/214A, the filter point calculator 216/216A, the soft symbol generator 210, the combiner 205, the first equalizer structure 302, the iterative equalizer structure 304, the IFDE/ITDE structure 304, the linear predictive coders 312a-c, the DFE 302, the feed-forward filter 402, the combiner 408, the slicer 410, the feed-backward filter 404, the LLR calculator 356, the DFE structure 354, the noise estimator 502, the symbol order reverser 504, and/or the combiner 508.

Alternatively, the components discussed in the embodiments above, including the receive filter 104, the linear equalizer 106, the FEC decoder 108, the whitening filter 112, the equalizer 114, the tap calculator 116, the DFT circuitry 202/212, the IDFT circuitry 206, the LLR calculator 208, the forward filter 204/204A, the backward filter 214/214A, the filter point calculator 216/216A, the soft symbol generator 210, the combiner 205, the first equalizer structure 302, the iterative equalizer structure 304, the IFDE/ITDE structure 304, the linear predictive coders 312a-c, the DFE 302, the feed-forward filter 402, the combiner 408, the slicer 410, the feed-backward filter 404, the LLR calculator 356, the DFE structure 354, the noise estimator 502, the symbol order reverser 504, and/or the combiner 508 may each be implemented using dedicated circuitry, such as an application specific integrated circuit (ASIC), a graphics processing unit (GPU), or a programmed field programmable gate array (FPGA) for performing the operations of some or all of the components above, e.g. the operations of the receive filter 104, the linear equalizer 106, the FEC decoder 108, the whitening filter 112, the equalizer 114, the tap calculator 116, the DFT circuitry 202/212, the IDFT circuitry 206, the LLR calculator 208, the forward filter 204/204A, the backward filter 214/214A, the filter point calculator 216/216A, the soft symbol generator 210, the combiner 205, the first equalizer structure 302, the iterative equalizer structure 304, the IFDE/ITDE structure 304, the linear predictive coders 312a-c, the DFE 302, the feed-forward filter 402, the combiner 408, the slicer 410, the feed-backward filter 404, the LLR calculator 356, the DFE structure 354, the noise estimator 502, the symbol order reverser 504, and/or the combiner 508.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed by a receiver during detection and decoding of a block of symbols over a plurality of iterations, the receiver including a forward error correction (FEC) decoder, a first equalizer structure, and an iterative equalizer structure; and the method comprising:
   during a first iteration i=1 of the detection and decoding: the first equalizer structure processing a received signal carrying the symbols to generate an output, and the FEC decoder performing FEC decoding on an input obtained from the output of the first equalizer structure;
   during each one of one or more other iterations i>1 of the detection and decoding: the iterative equalizer structure processing both the received signal carrying the symbols and an input obtained from an output of the FEC decoder from a previous iteration of the detection and decoding to generate an output of the iterative equalizer structure; and the FEC decoder performing FEC decoding on an input obtained from the output of the iterative equalizer structure.

2. The method of claim 1, wherein during each one of the one or more other iterations i>1 of the detection and decoding:
   the method includes: a forward filter of the iterative equalizer structure filtering an input obtained from the received signal; a backward filter of the iterative equalizer structure filtering the input obtained from the output of the FEC decoder from the previous iteration of the detection and decoding; and combining an output of the forward filter and an output of the backward filter to obtain a combined signal;

and the FEC decoding is performed on an input obtained from the combined signal.

3. The method of claim 2, wherein the combining comprises subtracting the output of the backward filter from the output of the forward filter.

4. The method of claim 2, further comprising computing at least one log likelihood ratio (LLR) value of the input obtained from the combined signal, and performing the FEC decoding using the at least one LLR value.

5. The method of claim 4, further comprising mapping the output of the FEC decoder to at least one symbol, and wherein an input to the backward filter is obtained from the at least one symbol.

6. The method of claim 5, wherein during each one of the one or more other iterations i>1 of the detection and decoding, the method further comprises:
applying a discrete Fourier transform (DFT) to the received signal to obtain a first Fourier transformed signal, and using the first Fourier transformed signal as an input to the forward filter;
applying an inverse DFT to the combined signal to obtain an inverse Fourier transformed signal, and computing the at least one LLR value from the inverse Fourier transformed signal;
applying the DFT to the at least one symbol mapped from the output of the FEC decoder to obtain a second Fourier transformed signal, and using the second Fourier transformed signal as the input to the backward filter.

7. The method of claim 1 further comprising performing linear predictive coding prior to the FEC decoding in the first iteration i=1 of the detection and decoding.

8. The method of claim 1, wherein the first equalizer structure comprises a linear predictive coder or a Bahl, Cocke, Jelinek and Raviv (BCJR) equalizer.

9. The method of claim 2, wherein the first equalizer structure comprises a decision feedback equalizer (DFE).

10. The method of claim 9, wherein the DFE comprises a feed-forward filter and a feed-backward filter, and wherein during the first iteration i=1 of the detection and decoding the method comprises:
the feed-forward filter filtering an input of the DFE;
the feed-backward filter generating an output using at least one previously detected symbol;
combining an output of the feed-forward filter with the output of the feed-backward filter to obtained a second combined signal; and
obtaining at least one estimated symbol from the second combined signal.

11. A receiver comprising:
an equalizer and a forward error correction (FEC) decoder to perform detection and decoding of a block of symbols over a plurality of iterations;
the equalizer including: (i) a first equalizer structure for use during a first iteration i=1 of the detection and decoding, and (ii) an iterative equalizer structure for use during one or more other iterations i>1 of the detection and decoding;
during the first iteration i=1 of the detection and decoding:
an input to the first equalizer structure is obtained from a received signal carrying the symbols, and an input to the FEC decoder is obtained from an output of the first equalizer structure;
during each one of the one or more other iterations i>1 of the detection and decoding: the input to the FEC decoder is obtained from an output of the iterative equalizer structure; one input to the iterative equalizer structure is obtained from the received signal; and another input to the iterative equalizer structure is obtained from an output of the FEC decoder from a previous iteration of the detection and decoding.

12. The receiver of claim 11, wherein the iterative equalizer structure comprises a forward filter, a backward filter, and a combiner to combine an output of the forward filter with an output of the backward filter; wherein the input to the FEC decoder is obtained from an output of the combiner; wherein an input to the forward filter is obtained from the received signal; and wherein an input to the backward filter is obtained from the output of the FEC decoder from the previous iteration of the detection and decoding.

13. The receiver of claim 12, wherein the combiner comprises circuitry to subtract the output of the backward filter from the output of the forward filter to obtain the output of the combiner.

14. The receiver of claim 12, further comprising a log likelihood ratio (LLR) calculator interposed between the combiner and FEC decoder, wherein an input of the LLR calculator is obtained from the output of the combiner, and wherein the input to the FEC decoder is obtained from at least one LLR value computed by the LLR calculator.

15. The receiver of claim 14, further comprising a symbol generator interposed between the FEC decoder and the backward filter, wherein the symbol generator is to map the output of the FEC decoder to at least one symbol, and wherein the input to the backward filter is obtained from the at least one symbol.

16. The receiver of claim 15, wherein the iterative equalizer structure comprises:
first discrete Fourier transform (DFT) circuitry to apply the DFT to the received signal to obtain a first Fourier transformed signal that is input to the forward filter;
inverse DFT circuitry interposed between the combiner and the LLR calculator to apply the inverse DFT to the output of the combiner and thereby provide an inverse Fourier transformed signal to the LLR calculator;
second DFT circuitry interposed between the symbol generator and the backward filter to apply the DFT to an output of the symbol generator and thereby provide a second Fourier transformed signal that is input to the backward filter.

17. The receiver of claim 11 further comprising a linear predictive coder (LPC) interposed between the first equalizer structure and the FEC decoder.

18. The receiver of claim 11, wherein the first equalizer structure comprises a linear predictive coder or a Bahl, Cocke, Jelinek and Raviv (BCJR) equalizer.

19. The receiver of claim 12, wherein the first equalizer structure comprises a decision feedback equalizer (DFE).

20. The receiver of claim 19, wherein the combiner is a first combiner, and wherein the DFE comprises:
a feed-forward filter to receive and filter an input of the DFE;
a feed-backward filter to generate an output using at least one previously detected symbol;
a second combiner to combine an output of the feed-forward filter with the output of the feed-backward filter; and
a slicer to obtain at least one estimated symbol from an output of the second combiner.

21. The receiver of claim 20, further comprising an LLR calculator interposed between the slicer and the FEC decoder, wherein an input of the LLR calculator is obtained from an output of the slicer, and wherein the input to the FEC decoder is obtained from at least one LLR value computed by the LLR calculator.

22. The receiver of claim 19, wherein the combiner is a first combiner, and wherein the DFE comprises:
a first DFE structure and a second DFE structure, wherein each one of the first DFE structure and the second DFE structure includes: a feed-forward filter to receive and filter an input; a feed-backward filter to generate an output using at least one previously detected symbol; a second combiner to combine an output of the feed-forward filter with the output of the feed-backward filter; and a slicer to obtain a block of estimated symbols from an output of the second combiner;
a first symbol order reverser and a second symbol order reverser, wherein each one of the first symbol order reverser and the second symbol order reverser is to reverse the order of a sequence of inputs; and
a third combiner to combine a first input of the third combiner with a second input of the third combiner;
wherein the DFE is to:
receive a first block of samples at the first DFE structure and output a first block of estimated symbols $\hat{s}_1$;
receive a second block of samples at the second DFE structure and output a second block of estimated symbols $\hat{s}_2$, wherein the second block of samples are obtained from a reverse of the first block of samples using the first symbol order reverser;
reverse the second block of estimated symbols $\hat{s}_2$ using the second symbol order reverser to obtained a reversed second block of estimated symbols;
receive the first block of estimated symbols $\hat{s}_1$ at the first input of the third combiner and receive the reversed second block of estimated symbols at the second input of the third combiner, and combine the first block of estimated symbols $\hat{s}_1$ with the reversed second block of estimated symbols to obtain an updated block of estimated symbols.

23. The receiver of claim 22, further comprising an LLR calculator interposed between the third combiner and the FEC decoder, wherein an input of the LLR calculator is obtained from the updated block of estimated symbols output from the third combiner, and wherein the input to the FEC decoder is obtained from at least one LLR value computed by the LLR calculator.

24. The receiver of claim 23, further comprising a linear predictive coder interposed between the output of the third combiner and the input of the LLR calculator, wherein the linear predictive coder is to perform linear predictive coding on noise samples to modify the updated block of estimated symbols.

* * * * *